United States Patent
Ramadneh et al.

(10) Patent No.: US 11,624,833 B2
(45) Date of Patent: Apr. 11, 2023

(54) SYSTEM AND METHOD FOR AUTOMATICALLY GENERATING SCAN LOCATIONS FOR PERFORMING A SCAN OF AN ENVIRONMENT

(71) Applicant: FARO Technologies, Inc., Lake Mary, FL (US)

(72) Inventors: Ahmad Ramadneh, Kornwestheim (DE); Aleksej Frank, Stuttgart (DE); Oliver Zweigle, Stuttgart (DE); Joao Santos, Kornwestheim (DE); Simon Raab, Santa Barbara, CA (US)

(73) Assignee: FARO Technologies, Inc., Lake Mary, FL (US)

( * ) Notice: Subject to any disclaimer, the term of this patent is extended or adjusted under 35 U.S.C. 154(b) by 320 days.

(21) Appl. No.: 16/866,940

(22) Filed: May 5, 2020

(65) Prior Publication Data

US 2020/0379116 A1 Dec. 3, 2020

Related U.S. Application Data

(60) Provisional application No. 62/853,770, filed on May 29, 2019.

(51) Int. Cl.
*G01S 17/894* (2020.01)
*G01S 7/48* (2006.01)
(Continued)

(52) U.S. Cl.
CPC .......... *G01S 17/894* (2020.01); *G01S 7/4808* (2013.01); *G01S 7/4814* (2013.01); *G01S 7/4817* (2013.01);
(Continued)

(58) Field of Classification Search
None
See application file for complete search history.

(56) References Cited

U.S. PATENT DOCUMENTS 10,210,285 B2 2/2019 Wong et al.
10,339,384 B2 7/2019 Lorenzo
(Continued)

FOREIGN PATENT DOCUMENTS

WO 2014068406 A2 5/2014

OTHER PUBLICATIONS

Extended European Search Report; European Application No. 20177079.9; Application Filed: May 28, 2020; Search Report dated Sep. 28, 2020; 8 pages.
(Continued)

*Primary Examiner* — Xiaolan Xu
(74) *Attorney, Agent, or Firm* — McCarter & English, LLP; Dave S. Christensen

(57) ABSTRACT

Provided are embodiments including a system for automatically generating a plan of scan locations for performing a scanning operation where the system includes a storage medium that is coupled to a processor. The processor is configured to receive a map of an environment, apply a distance transform to the map, wherein the distance transform determines a path through the map, wherein the path comprises a plurality of points, and identify a set of candidate scan locations based on the path. The processor is also configured to select scan locations from the set of candidate scan locations for performing 3D scans, and perform the 3D scans of the environment based on the selected scan locations. Also provided are embodiments for a method and computer program product for automatically generating a plan of scan locations for performing a scanning operation.

17 Claims, 26 Drawing Sheets

(51) Int. Cl.
  *G01S 7/481*  (2006.01)
  *G01S 17/10*  (2020.01)
  *G06T 3/40*  (2006.01)
  *G06T 5/00*  (2006.01)
  *G06T 5/50*  (2006.01)

(52) U.S. Cl.
  CPC ............ *G01S 17/10* (2013.01); *G06T 3/4084* (2013.01); *G06T 5/002* (2013.01); *G06T 5/50* (2013.01); *G06T 2200/04* (2013.01); *G06T 2207/20182* (2013.01)

(56) References Cited

U.S. PATENT DOCUMENTS

| | | | |
|---|---|---|---|
| 2004/0170302 A1* | 9/2004 | Museth | G06T 19/20 382/107 |
| 2013/0054187 A1 | 2/2013 | Pochiraju et al. | |
| 2016/0179095 A1 | 6/2016 | Sarid et al. | |
| 2016/0291160 A1* | 10/2016 | Zweigle | G01S 7/4813 |

OTHER PUBLICATIONS

European Office Action for European Application No. 20177079.9; Application Filed: May 28, 2020; Office Action dated Dec. 14, 2022; 5 pages.

\* cited by examiner

SYSTEM AND METHOD FOR AUTOMATICALLY GENERATING SCAN LOCATIONS FOR PERFORMING A SCAN OF AN ENVIRONMENT

CROSS-REFERENCE TO RELATED APPLICATIONS

This application claims the benefit of U.S. Provisional Application No. 62/853,770, filed May 29, 2019, and entitled "A SYSTEM AND METHOD FOR AUTOMATICALLY GENERATING SCAN LOCATIONS FOR PERFORMING A SCAN OF AN ENVIRONMENT", the content of which is incorporated herein by reference in its entirety.

BACKGROUND

The present application is directed to a system that optically scans an environment, such as a building, and in particular to a system and method for automatically generating scan locations for performing a scan of an environment.

3D scanners can be used for a variety of applications. For example, 3D scanners can perform a scan in a particular space and obtain a detailed representation of the space in 3D. Existing measurement systems typically use a scanning device that determines coordinates of surfaces in the environment by both emitting a light and capturing a reflection to determine a distance or by triangulation using cameras. Oftentimes, the 3D scanners are moved about the environment to multiple locations to capture the complete environment because the scanners have a limited measurement range and field-of-view. Each of the obtained scans from the different locations are subsequently combined and registered together.

Accordingly, while existing 3D scanners are suitable for their intended purposes, what is needed is a 3D scanner having certain features of embodiments of the present invention.

BRIEF DESCRIPTION

Embodiments of the present invention are directed to a computer-implemented method for a system for automatically generating a plan of scan locations for performing a scanning operation. The system includes a storage medium coupled to a processor, where the processor is configured to receive a map of an environment, apply a distance transform to the map, wherein the distance transform determines a path through the map, wherein the path comprises a plurality of points, and identify a set of candidate scan locations based on the path. The processor is also configured to select scan locations from the set of candidate scan locations for performing 3D scans, and perform the 3D scans of the environment based on the selected scan locations.

Embodiments of the present invention are directed to a method for automatically generating a plan of scan locations for performing a scanning operation. The method includes receiving a map of an environment, applying a distance transform to the map, wherein the distance transform determines a path through the map, wherein the path comprises a plurality of scan locations, and identifying a set of candidate scan locations based on the path. The method includes selecting scan locations from the set of candidate scan locations for performing 3D scans, and performing the 3D scans of the environment based on the selected scan locations.

Embodiments of the invention are directed to a computer program product for automatically generating a plan of scan locations for performing a scanning operation, the computer program product comprising a computer readable storage medium having program instructions embodied therewith. The program instructions are executable by a processor to cause the processor to perform a method. A non-limiting example of the method includes receiving a map of an environment, applying a distance transform to the map, wherein the distance transform determines a path through the map, wherein the path comprises a plurality of scan locations, and identifying a set of candidate scan locations based on the path. The method includes selecting scan locations from the set of candidate scan locations for performing 3D scans, and performing the 3D scans of the environment based on the selected scan locations.

Additional technical features and benefits are realized through the techniques of the present invention. Embodiments and aspects of the invention are described in detail herein and are considered a part of the claimed subject matter. These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a 3D measuring device having a 3D scanner. Embodiments of the invention provide advantages acquiring three-dimensional (3D) coordinates of an area of the environment that is shadowed from the 3D measuring device using a technique to optimally locate scan locations through the environment. Embodiments of the invention provide advantages in acquiring 3D coordinates to ensure that an accurate and complete representation of the environment is captured in an efficient manner by the 3D scanner for processing.

However, 3D scanners have a limited range of visibility for scanning and frequently are moved to obtain a complete scan of the environment. This may be done, for example, to acquire data on areas that are occluded, shadowed or blocked from an initial scanning location. Efficient scanner placement is desired to avoid unnecessary set-up and movement of the scanner to save time and reduce labor costs. In addition, sufficient coverage of the environment should be obtained so that additional scans are not required at a later date or time to complete processing the 3D model which can add delay into completing the task.

Inexperienced users can collect a number of scans to attempt to capture all of the scan data needed for producing the 3D models, the number of scans can be numerous. Several factors must be considered when determining the placement of a scanning device to obtain the scan data of the environment. For example, the overlap between consecutives scans, the distance to walls or other objects, the scans from different perspective to avoid occlusions, are just a few factors that must be considered.

Even an experienced user may face challenges when attempting to determine an efficient placement of the scanning device. There may be a need to determine the locations to perform the scans to produce the 3D model of the environment. The techniques described herein provide for automatic generation scan locations to develop a scan plan. The methods described herein provide techniques to easily compute an efficient scanning plan using a 2D generated map of the environment where the 3D scanning is to be performed. The map is further analyzed and processed to compute the desired observation points/scanning locations, taking into account the maximum range of the scanning devices, overlap conditions, and obstructions caused by objects in the environment that were mapped into the 2D map.

Figure 1:
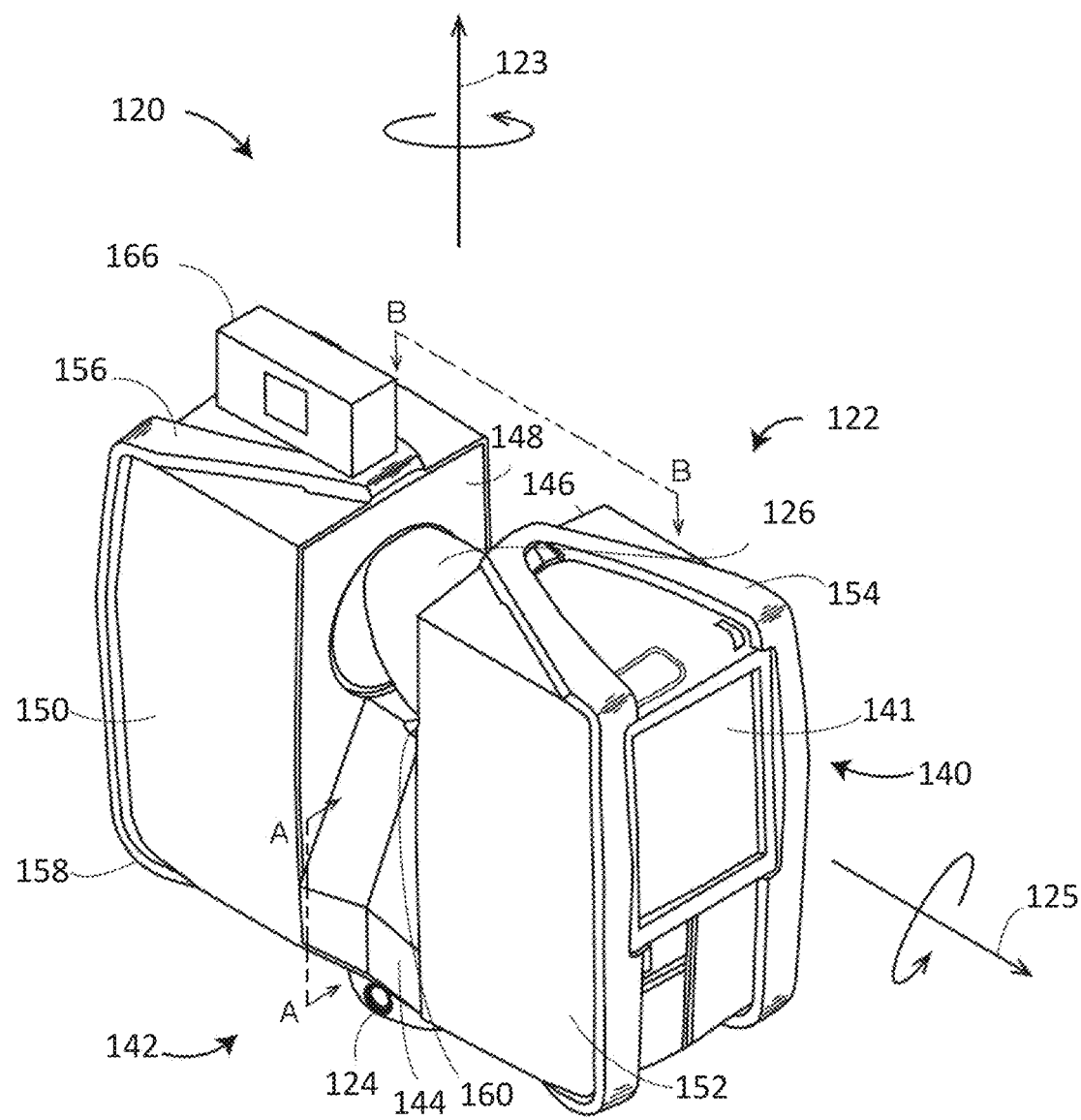
FIG. 1 is a perspective view of a laser scanner in accordance with an embodiment of the invention.
Figure 2:
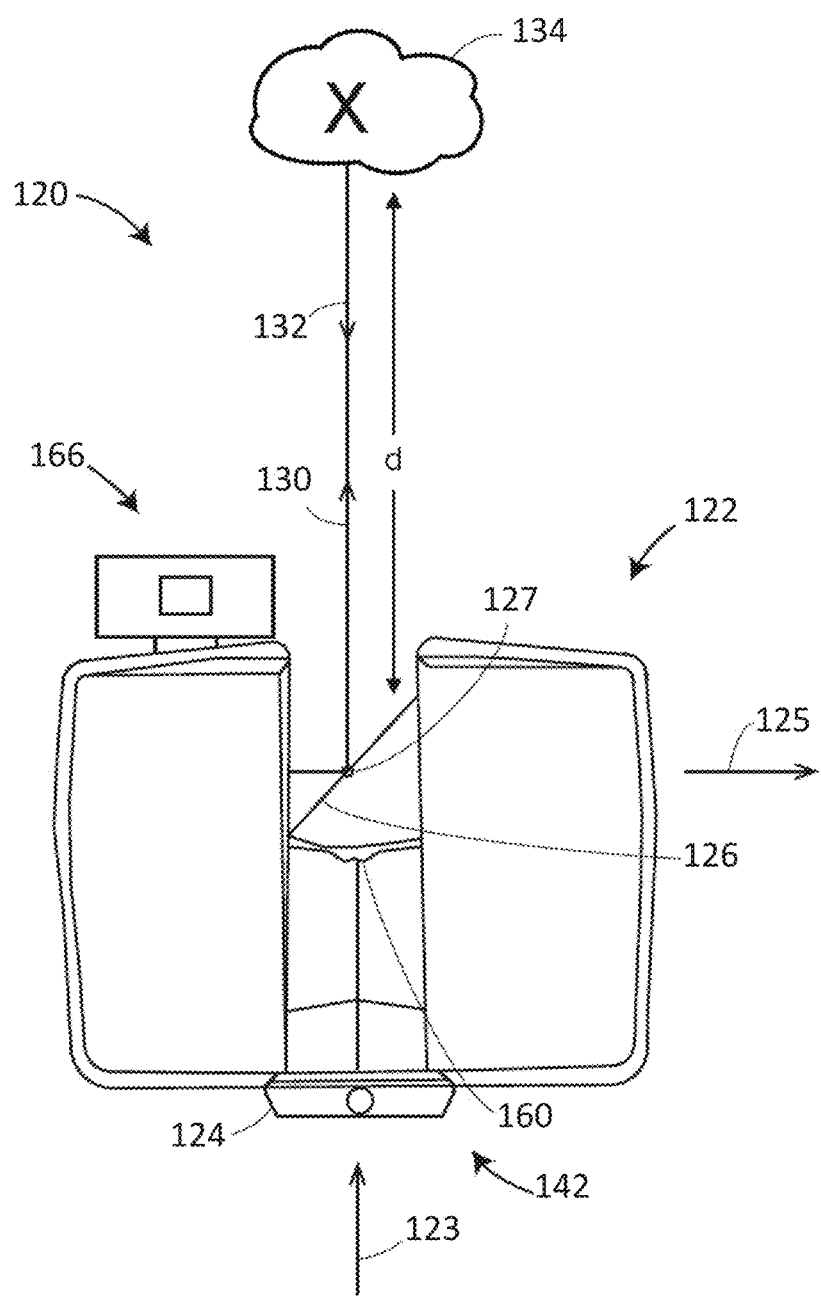
FIG. 2 is a side view of the laser scanner illustrating a method of measurement according to an embodiment.
Figure 3:
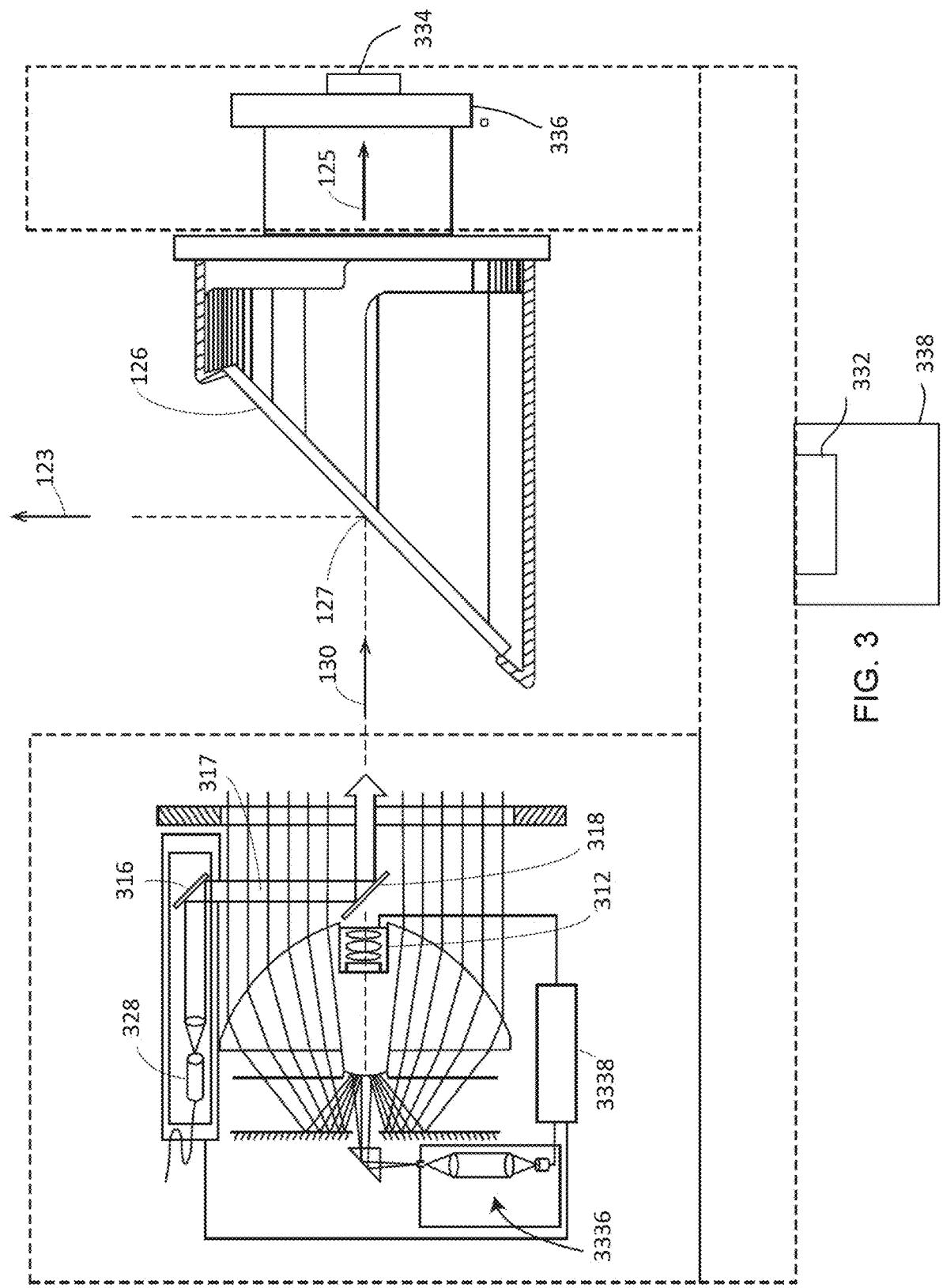
FIG. 3 is a schematic illustration of the optical, mechanical, and electrical components of the laser scanner according to an embodiment.

Referring now to FIGS. 1-3, a 3D scanner or laser scanner 120 is shown for optically scanning and measuring the environment surrounding the laser scanner 120. The laser scanner 120 has a measuring head 122 and a base 124. The measuring head 122 is mounted on the base 124 such that the laser scanner 120 may be rotated about a vertical axis 123. In one embodiment, the measuring head 122 includes a gimbal point 127 that is a center of rotation about the vertical axis 123 and a horizontal axis 125. The measuring head 122 has a rotary mirror 126, which may be rotated about the horizontal axis 125. The rotation about the vertical axis may be about the center of the base 124. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 122 is further provided with an electromagnetic radiation emitter, such as light emitter 328, for example, that emits an emitted light beam 130. In one embodiment, the emitted light beam 130 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 130 is amplitude or intensity modulated, for example, with a sinusoidal waveform or with a rectangular waveform. The emitted light beam 130 is emitted by the light emitter 28 onto a beam steering unit, such as mirror 126, where it is deflected to the environment. A reflected light beam 132 is reflected from the environment by an object 134. The reflected or scattered light is intercepted by the rotary mirror 126 and directed into a light receiver 36. The directions of the emitted light beam 130 and the reflected light beam 132 result from the angular positions of the rotary mirror 126 and the measuring head 122 about the axes 125 and 123, respectively. These angular positions in turn depend on the corresponding rotary drives or motors.

Coupled to the light emitter 328 and the light receiver 3336 is a controller 3338. The controller 3338 determines, for a multitude of measuring points X, a corresponding number of distances d between the laser scanner 120 and the points X on object 134. The distance to a particular point X is determined based at least in part on the speed of light in air through which electromagnetic radiation propagates from the device to the object point X. In one embodiment the phase shift of modulation in light emitted by the laser scanner 120 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 120 takes place by rotating the rotary mirror 126 relatively quickly about axis 125 while rotating the measuring head 122 relatively slowly about axis 123, thereby moving the assembly in a spiral pattern. In an exemplary embodiment, the rotary mirror rotates at a maximum speed of 5820 revolutions per minute. For such a scan, the gimbal point 127 defines the origin of the local stationary reference system. The base 124 rests in this local stationary reference system.

In addition to measuring a distance d from the gimbal point 127 to an object point X, the scanner 120 may also collect gray-scale information related to the received optical power (equivalent to the term "brightness.") The gray-scale value may be determined at least in part, for example, by integration of the bandpass-filtered and amplified signal in the light receiver 3336 over a measuring period attributed to the object point X.

The measuring head 122 may include a display device 140 integrated into the laser scanner 120. The display device 140 may include a graphical touch screen 141, as shown in FIG. 1, which allows the operator to set the parameters or initiate the operation of the laser scanner 120. For example, the screen 141 may have a user interface that allows the operator to provide measurement instructions to the device, and the screen may also display measurement results.

The laser scanner 120 includes a carrying structure 142 that provides a frame for the measuring head 122 and a platform for attaching the components of the laser scanner 120. In one embodiment, the carrying structure 142 is made from a metal such as aluminum. The carrying structure 142 includes a traverse member 144 having a pair of walls 146, 148 on opposing ends. The walls 146, 148 are parallel to each other and extend in a direction opposite the base 124. Shells 150, 152 are coupled to the walls 146, 148 and cover the components of the laser scanner 120. In the exemplary embodiment, the shells 150, 152 are made from a plastic material, such as polycarbonate or polyethylene for example. The shells 150, 152 cooperate with the walls 146, 148 to form a housing for the laser scanner 120.

On an end of the shells 150, 152 opposite the walls 146, 148 a pair of yokes 154, 156 are arranged to partially cover the respective shells 150, 152. In the exemplary embodiment, the yokes 154, 156 are made from a suitably durable material, such as aluminum for example, that assists in protecting the shells 150, 152 during transport and operation. The yokes 154, 156 each includes a first arm portion 158 that is coupled, such as with a fastener for example, to the traverse 144 adjacent the base 124. The arm portion 158 for each yoke 154, 156 extends from the traverse 144 obliquely to an outer corner of the respective shell 150, 152. From the outer corner of the shell, the yokes 154, 156 extend along the side edge of the shell to an opposite outer corner of the shell. Each yoke 154, 156 further includes a second arm portion that extends obliquely to the walls 146, 148. It should be appreciated that the yokes 154, 156 may be coupled to the traverse 142, the walls 146, 148 and the shells 150, 154 at multiple locations.

The pair of yokes 154, 156 cooperate to circumscribe a convex space within which the two shells 150, 152 are arranged. In the exemplary embodiment, the yokes 154, 156 cooperate to cover all of the outer edges of the shells 150, 154, while the top and bottom arm portions project over at least a portion of the top and bottom edges of the shells 150, 152. This provides advantages in protecting the shells 150, 152 and the measuring head 122 from damage during transportation and operation. In other embodiments, the yokes 154, 156 may include additional features, such as handles to facilitate the carrying of the laser scanner 120 or attachment points for accessories for example.

On top of the traverse 144, a prism 160 is provided. The prism extends parallel to the walls 146, 148. In the exemplary embodiment, the prism 160 is integrally formed as part of the carrying structure 142. In other embodiments, the prism 160 is a separate component that is coupled to the traverse 144. When the mirror 126 rotates, during each rotation the mirror 126 directs the emitted light beam 130 onto the traverse 144 and the prism 160. Due to non-linearities in the electronic components, for example in the light receiver 3336, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 3336. Since the prism 160 is at a known distance from the gimbal point 127, the measured optical power level of light reflected by the prism 160 may be used to correct distance measurements for other measured points, thereby allowing for compensation to correct for the effects of environmental variables such as temperature. In the exemplary embodiment, the resulting correction of distance is performed by the controller 3338.

In an embodiment, the base 124 is coupled to a swivel assembly (not shown) such as that described in commonly owned U.S. Pat. No. 8,705,012 ('012), which is incorporated by reference herein. The swivel assembly is housed within the carrying structure 142 and includes a motor 138 that is configured to rotate the measuring head 122 about the axis 123. In an embodiment, the angular/rotational position of the measuring head 122 about the axis 123 is measured by angular encoder 334.

An auxiliary image acquisition device 166 may be a device that captures and measures a parameter associated with the scanned area or the scanned object and provides a signal representing the measured quantities over an image acquisition area. The auxiliary image acquisition device 166 may be, but is not limited to, a pyrometer, a thermal imager, an ionizing radiation detector, or a millimeter-wave detector. In an embodiment, the auxiliary image acquisition device 166 is a color camera.

In an embodiment, a central color camera (first image acquisition device) 312 is located internally to the scanner and may have the same optical axis as the 3D scanner device. The central color camera 312 may be in addition to and an alternative to the image acquisition device 166. In this embodiment, the first image acquisition device 112 is integrated into the measuring head 122 and arranged to acquire images along the same optical pathway as emitted light beam 130 and reflected light beam 132. In this embodiment, the light from the light emitter 328 reflects off a fixed mirror 316 and travels to dichroic beam-splitter 318 that reflects the light 317 from the light emitter 128 onto the rotary mirror 126. In an embodiment, the mirror 126 is rotated by a motor 336 and the angular/rotational position of the mirror is measured by angular encoder 334. The dichroic beam-splitter 318 allows light to pass through at wavelengths different than the wavelength of light 317. For example, the light emitter 328 may be a near infrared laser light (for example, light at wavelengths of 780 nm or 1150 nm), with the dichroic beam-splitter 318 configured to reflect the infrared laser light while allowing visible light (e.g., wavelengths of 400 to 700 nm) to transmit through. In other embodiments, the determination of whether the light passes through the beam-splitter 318 or is reflected depends on the polarization of the light. The digital camera 312 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 123 and by steering the mirror 126 about the axis 125.

Figure 4:
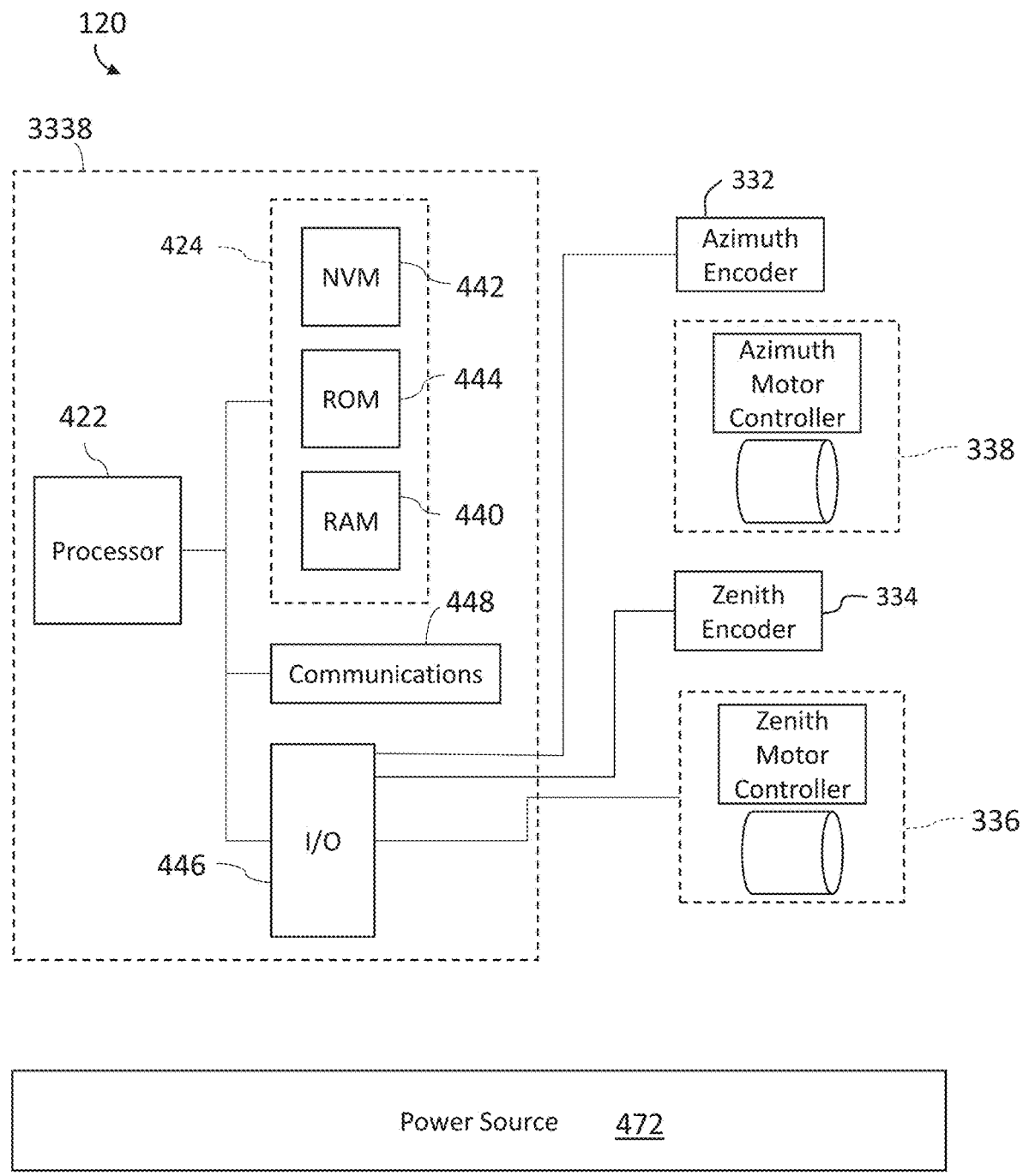
FIG. 4 illustrates a schematic illustration of the laser scanner of FIG. 1 according to an embodiment.
Figure 5:
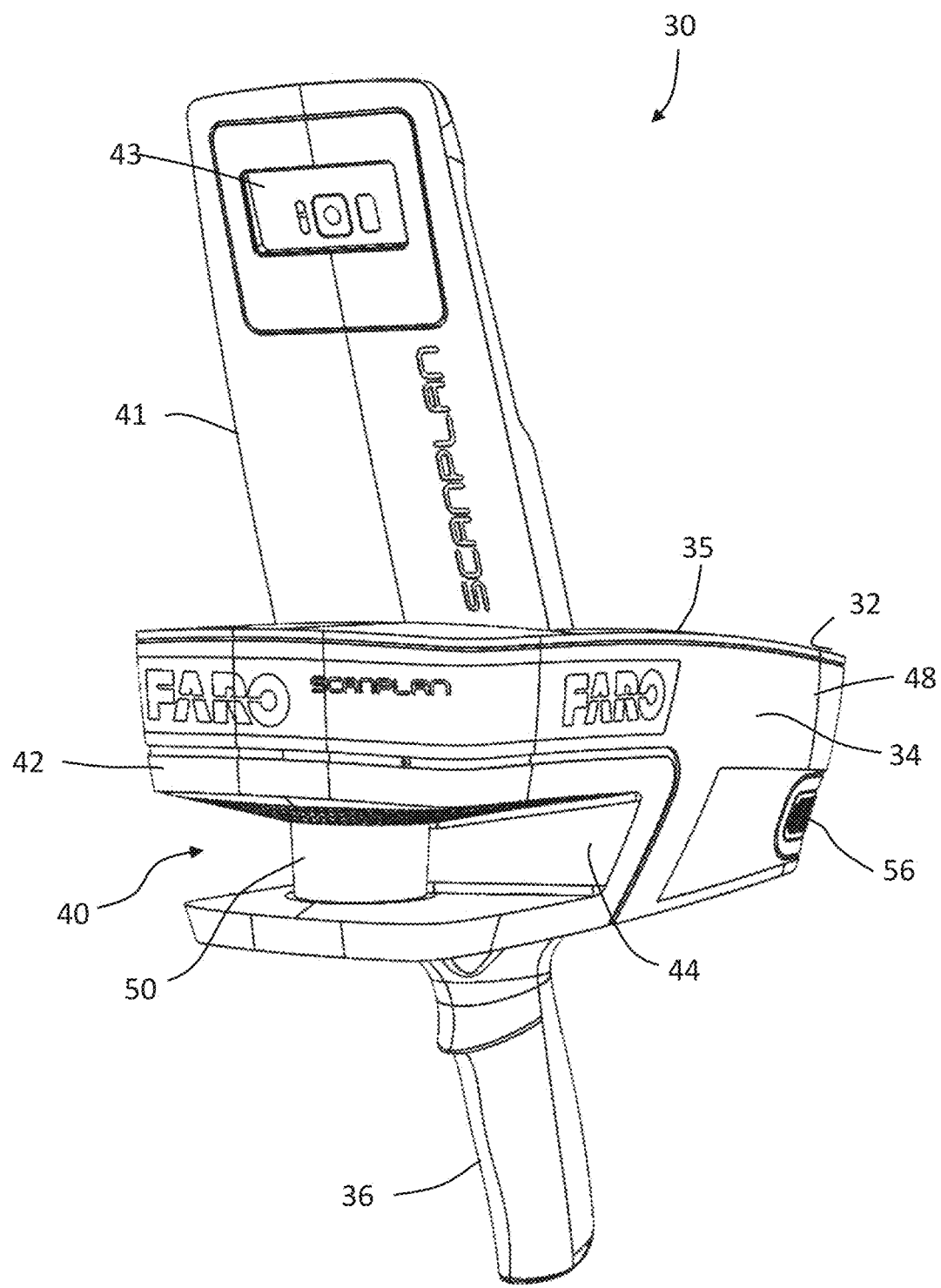
FIGS. 5-7 are perspective views of a scanning and mapping system in accordance with an embodiment.
Figure 6:
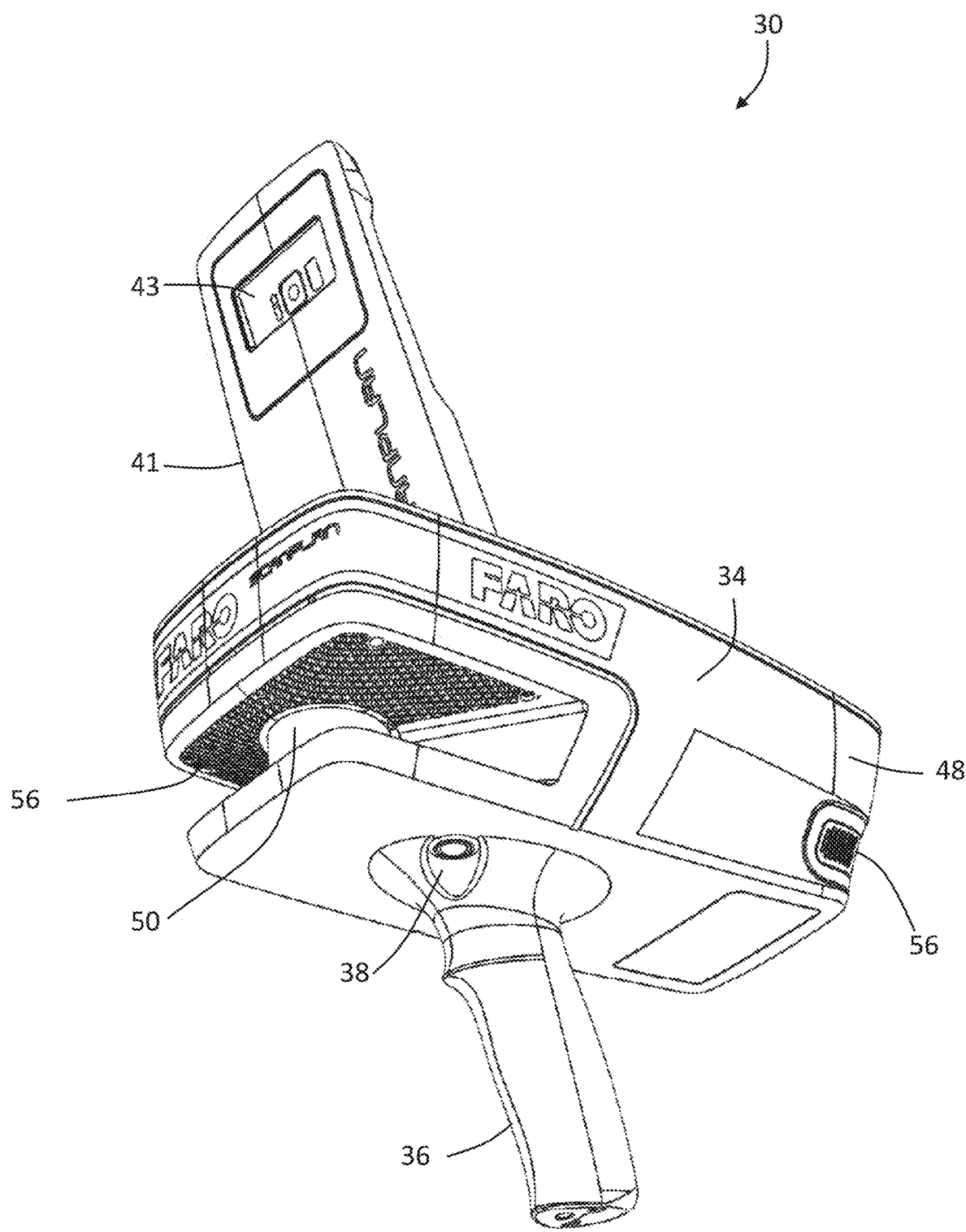
Figure 7:
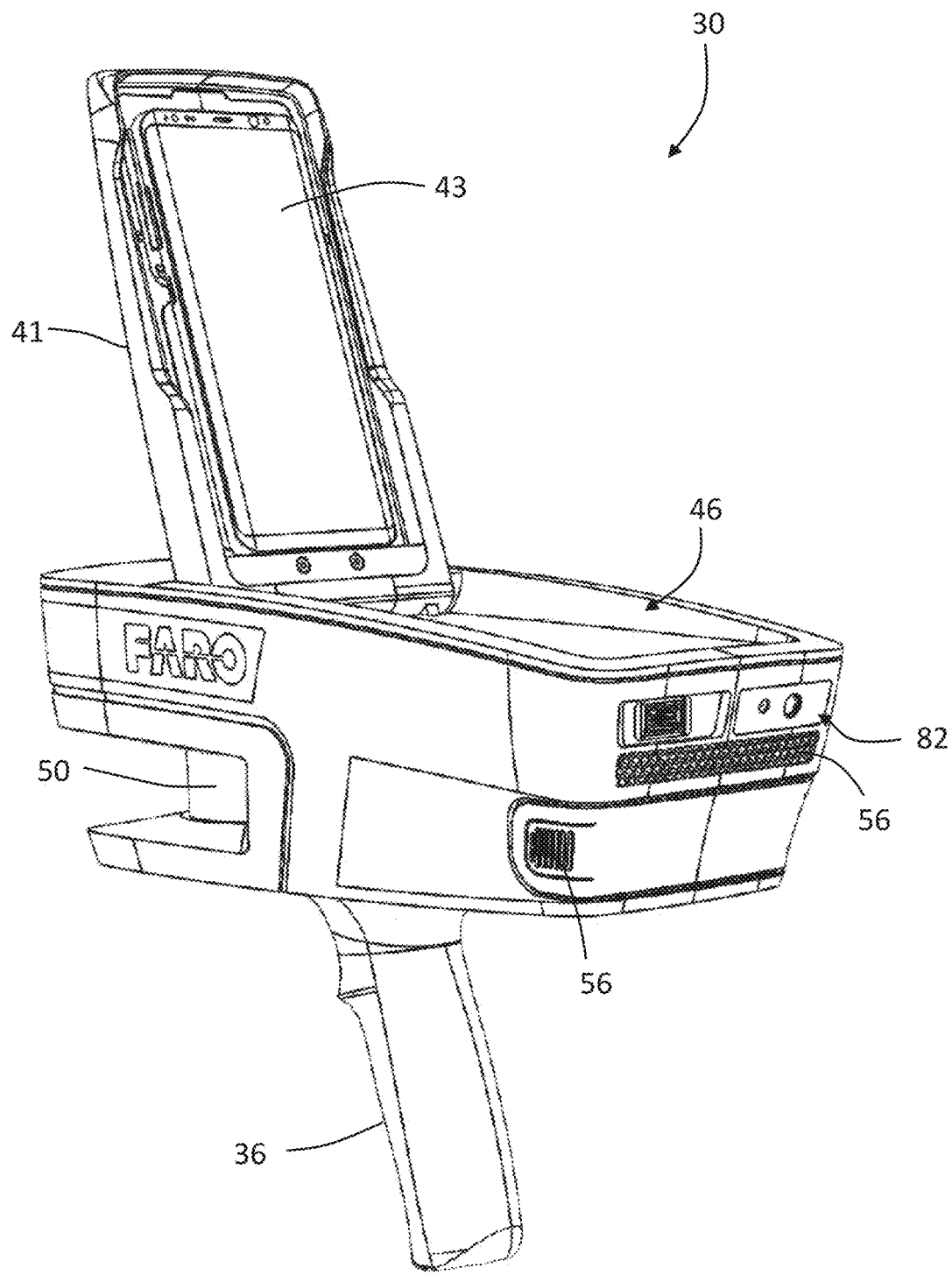
Figure 8:
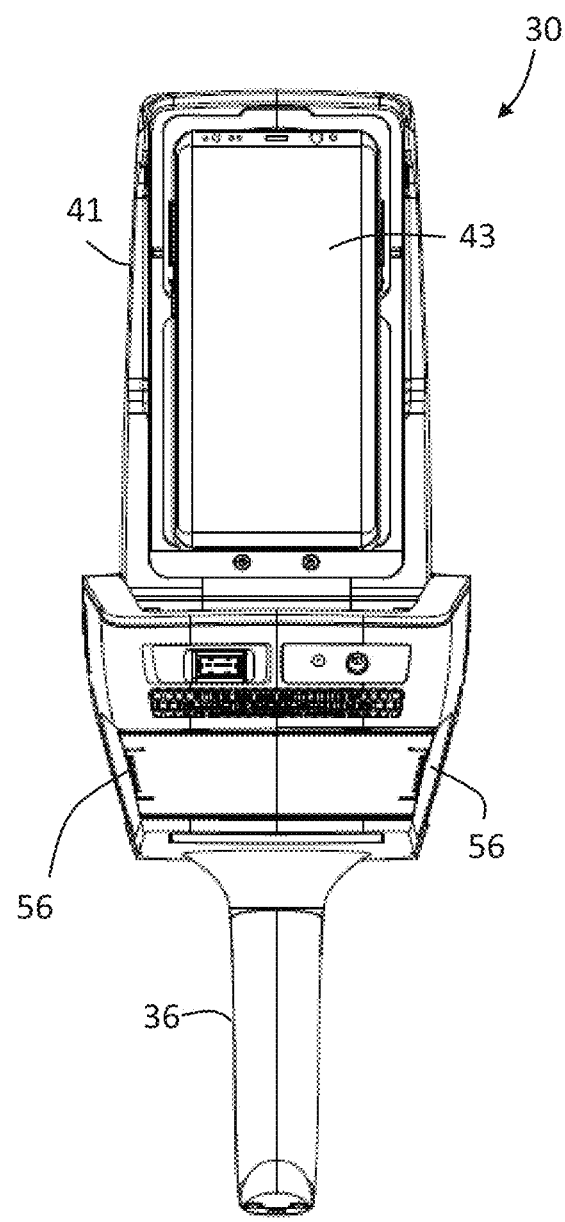
FIG. 8 is a first end view of the system of FIG. 5.
Figure 9:
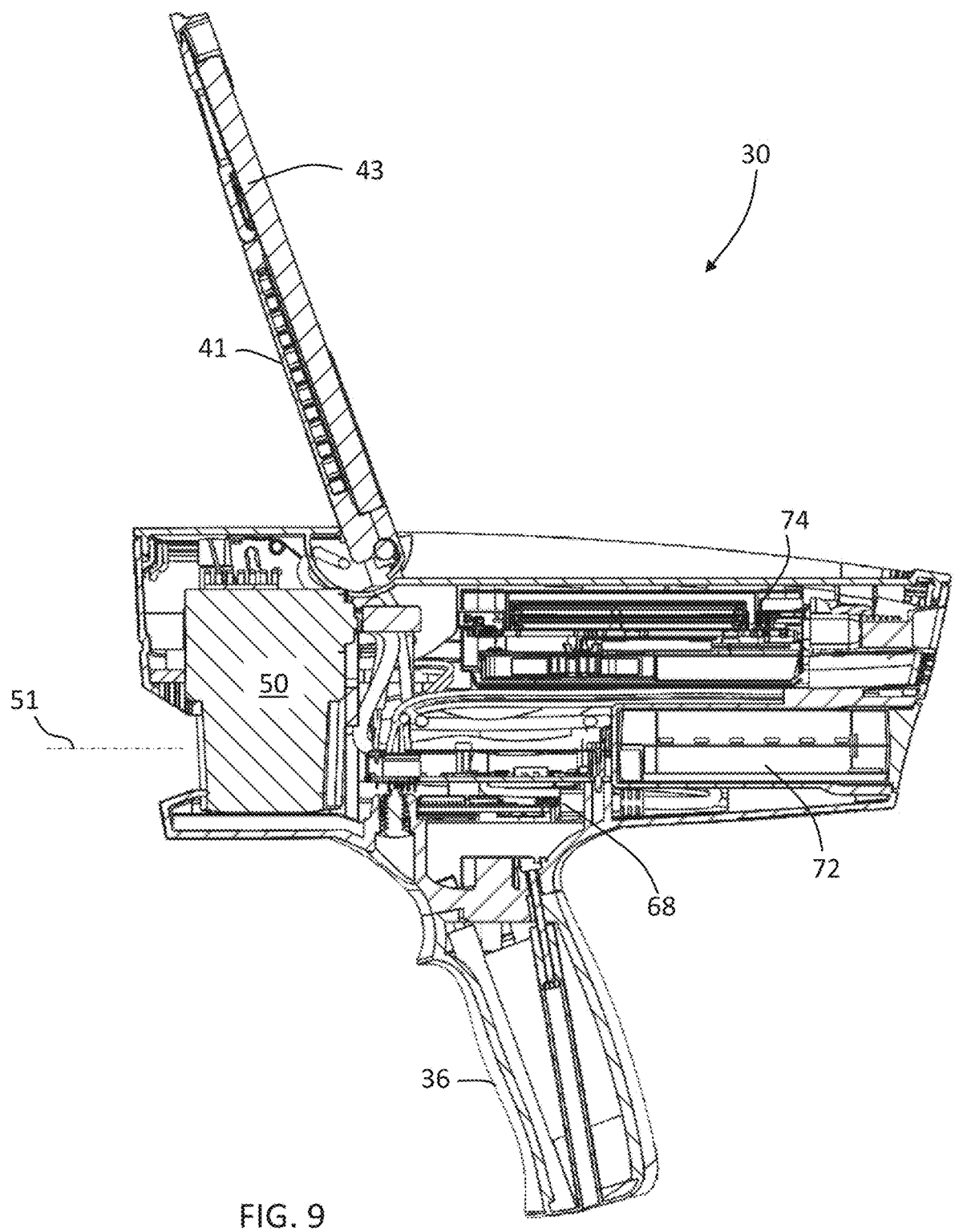
FIG. 9 is a side sectional view of the system of FIG. 5.

Referring now to FIG. 4 with continuing reference to FIGS. 1-3, elements are shown of the laser scanner 120. Controller 3338 is a suitable electronic device capable of accepting data and instructions, executing the instructions to process the data, and presenting the results. The controller 3338 includes one or more processing elements 422. The processors may be microprocessors, field programmable gate arrays (FPGAs), digital signal processors (DSPs), and generally any device capable of performing computing functions. The one or more processors 422 have access to memory 424 for storing information.

Controller 3338 is capable of converting the analog voltage or current level provided by light receiver 3336 into a digital signal to determine a distance from the laser scanner 120 to an object in the environment. Controller 3338 uses the digital signals that act as input to various processes for controlling the laser scanner 120. The digital signals represent one or more laser scanner 120 data including but not limited to distance to an object, images of the environment, images acquired by image acquisition device 126, color camera 312, angular/rotational measurements by a first or azimuth encoder 332, and angular/rotational measurements by a second axis or zenith encoder 334.

In general, controller 3338 accepts data from encoders 332, 334, light receiver 3336, light source 328, and cameras 126, 312 and is given certain instructions for the purpose of generating a 3D point cloud of a scanned environment. Controller 3338 provides operating signals to the light source 328, light receiver 3336, cameras 126, 312, zenith motor 336 and azimuth motor 338. The controller 3338 compares the operational parameters to predetermined variances and if the predetermined variance is exceeded, generates a signal that alerts an operator to a condition. The data received by the controller 3338 may be displayed on a user interface 40 coupled to controller 3338. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 3338. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 120.

The controller 3338 may also be coupled to external computer networks such as a local area network (LAN) and the Internet. A LAN interconnects one or more remote computers, which are configured to communicate with controller 3338 using a well-known computer communications protocol such as TCP/IP (Transmission Control Protocol/Internet(^) Protocol), RS-232, ModBus, and the like. Additional systems 20 may also be connected to LAN with the controllers 3338 in each of these systems 20 being configured to send and receive data to and from remote computers and other systems 20. The LAN may be connected to the Internet. This connection allows controller 3338 to communicate with one or more remote computers connected to the Internet.

The processors 422 are coupled to memory 424. The memory 424 may include random access memory (RAM) device 440, a non-volatile memory (NVM) device 442, and a read-only memory (ROM) device 444. In addition, the processors 422 may be connected to one or more input/output (I/O) controllers 446 and a communications circuit 448. In an embodiment, the communications circuit 92 provides an interface that allows wireless or wired communication with one or more external devices or networks, such as the LAN discussed above.

Controller 3338 includes operation control methods embodied in application code. These methods are embodied in computer instructions written to be executed by processors 422, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Terms such as processor, controller, computer, DSP, FPGA are understood in this document to mean a computing device that may be located within an instrument, distributed in multiple elements throughout an instrument, or placed external to an instrument.

The techniques described herein provide for identifying an efficient set of scan locations for the above 3D scanner device such as the laser scanner 120. The present embodiment relates to a device that includes a system having a 2D scanner that operates to generate a two-dimensional map of an environment.

Referring now to FIGS. 5-9, an embodiment of a system 30 having a housing 32 that includes a body portion 34 and a handle portion 36. In an embodiment, the handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair of walls 44 that are angled towards a second end 48. As will be discussed in more detail herein, a portion of a two-dimensional scanner 50 is arranged between the walls 44. The walls 44 are angled to allow the scanner 50 to operate by emitting a light over a large angular area without interference from the walls 44. As will be discussed in more detail herein, the end 42 may further include a three-dimensional camera or RGBD camera 60.

Figure 14:
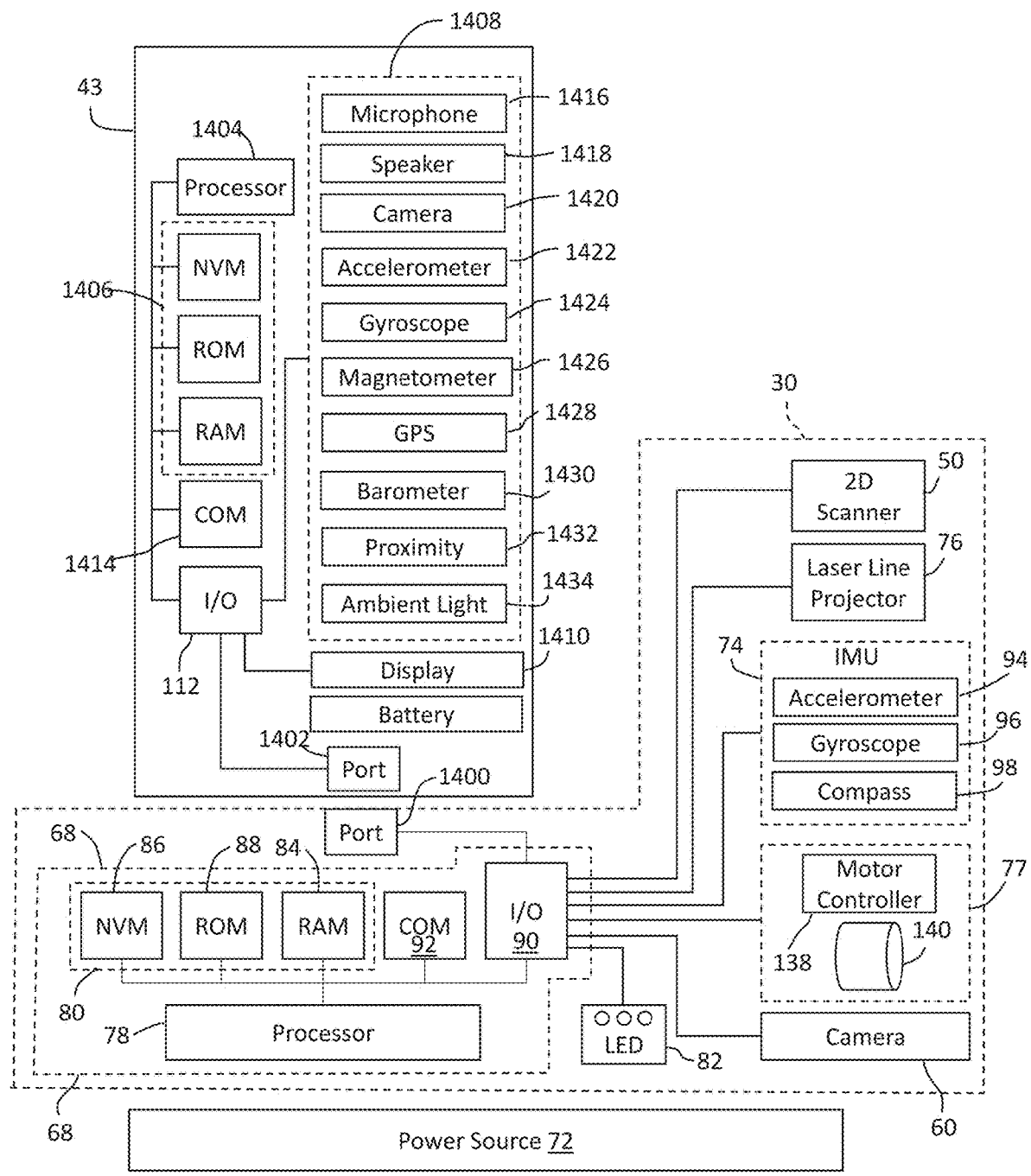
FIG. 14 is a block diagram of the system of FIG. 1 and FIG. 6.

Extending from the center portion 35 is a mobile device holder 41. The mobile device holder 41 is configured to securely couple a mobile device 43 to the housing 32. The holder 41 may include one or more fastening elements, such as a magnetic or mechanical latching element for example, that couples the mobile device 43 to the housing 32. In an embodiment, the mobile device 43 is coupled to communicate with a controller 68 (FIG. 14). The communication between the controller 68 and the mobile device 43 may be via any suitable communications medium, such as wired, wireless or optical communication mediums for example.

In the illustrated embodiment, the holder 41 is pivotally coupled to the housing 32, such that it may be selectively rotated into a closed position within a recess 46. In an embodiment, the recess 46 is sized and shaped to receive the holder 41 with the mobile device 43 disposed therein.

In the exemplary embodiment, the second end 48 includes a plurality of exhaust vent openings 56. In an embodiment, shown in FIGS. 11-13, the exhaust vent openings 56 are fluidly coupled to intake vent openings 58 arranged on a bottom surface 62 of center portion 35. The intake vent openings 58 allow external air to enter a conduit 64 having an opposite opening 66 (FIG. 10) in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Figure 10:
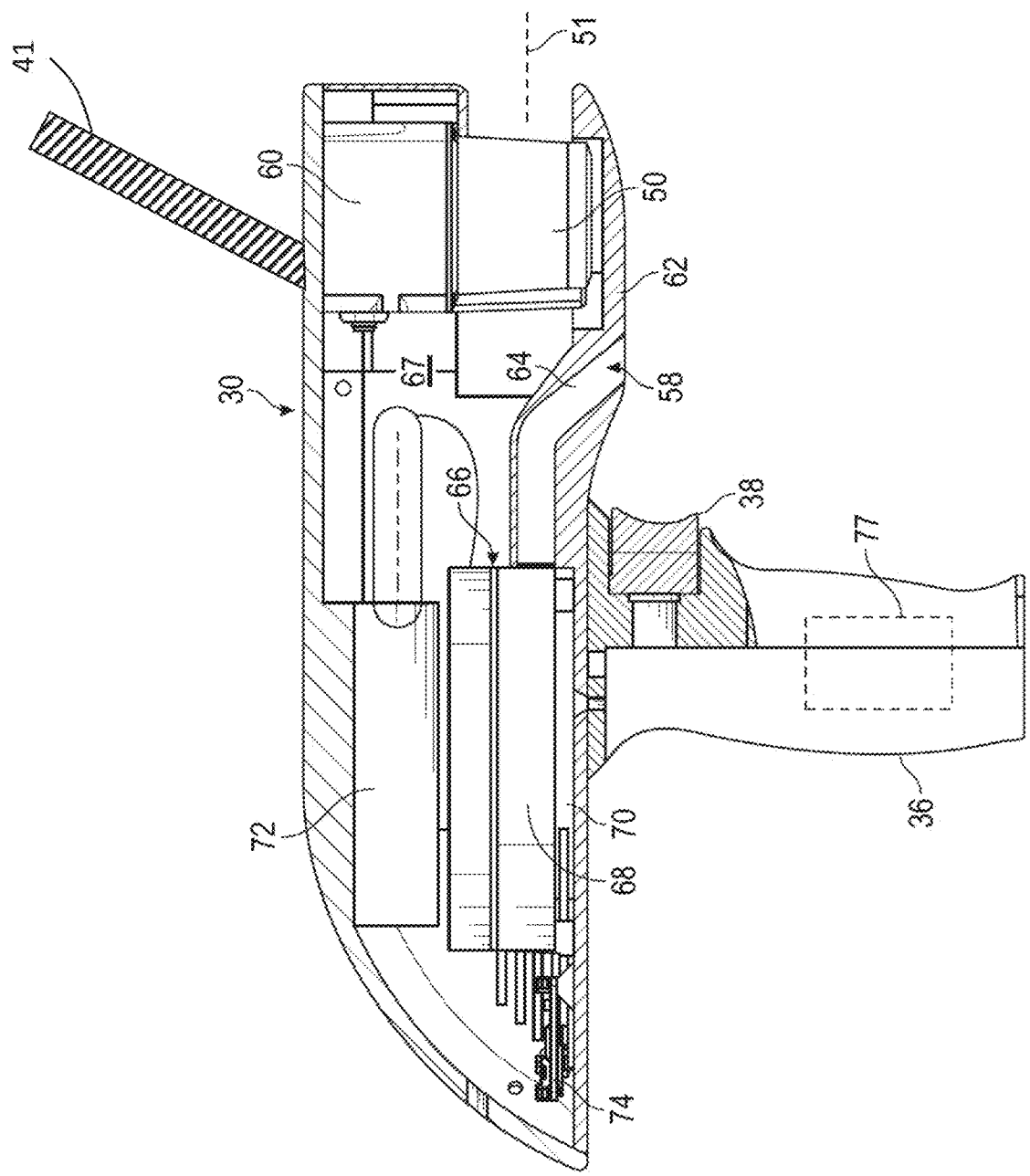
FIG. 10 is a side sectional view of the system of a scanning and mapping system in accordance with another embodiment.
Figure 11:
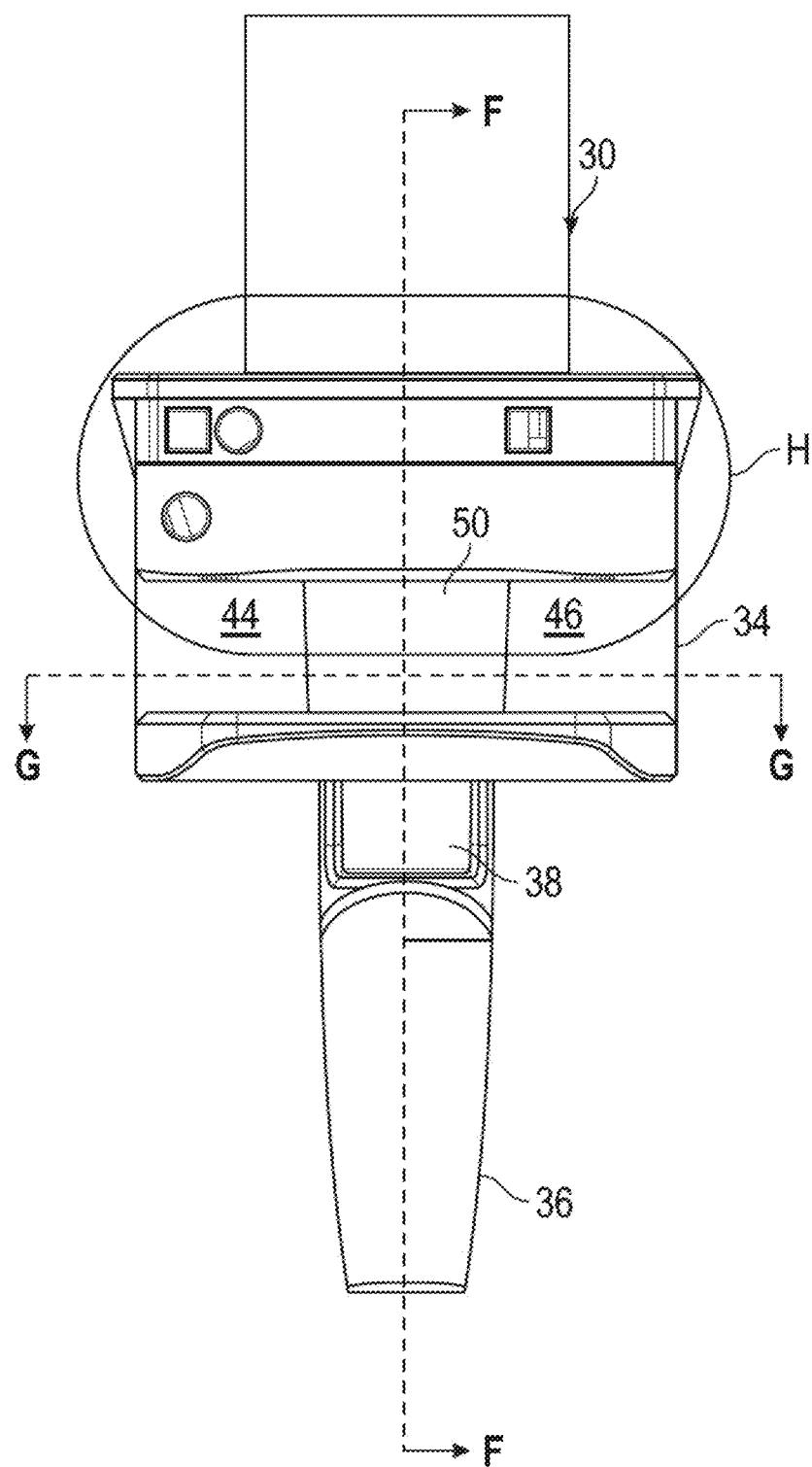
FIG. 11 is a first end view of the system of FIG. 6.
Figure 12:
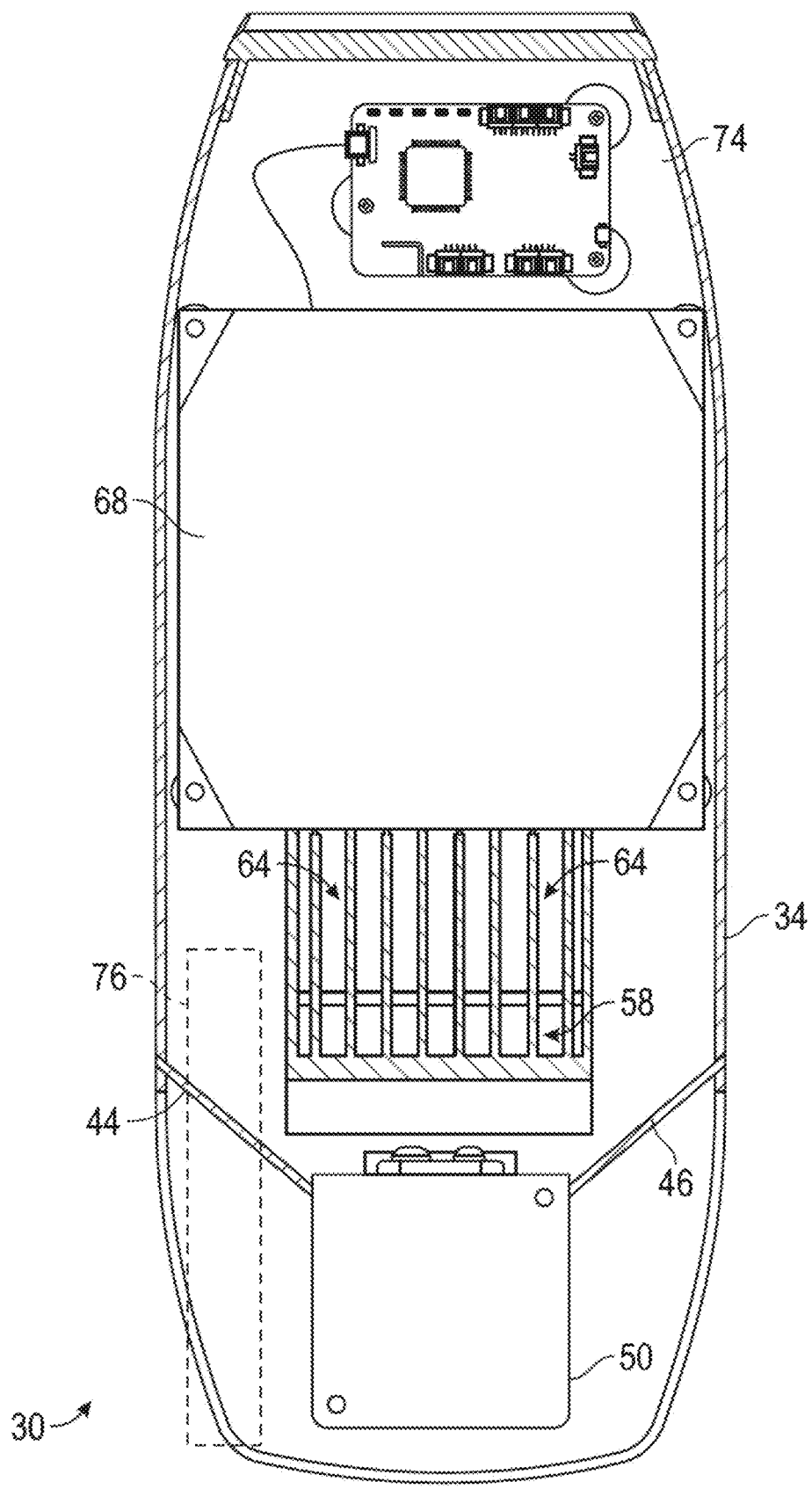
FIG. 12 is a top sectional view of the system of FIG. 6.
Figure 13:
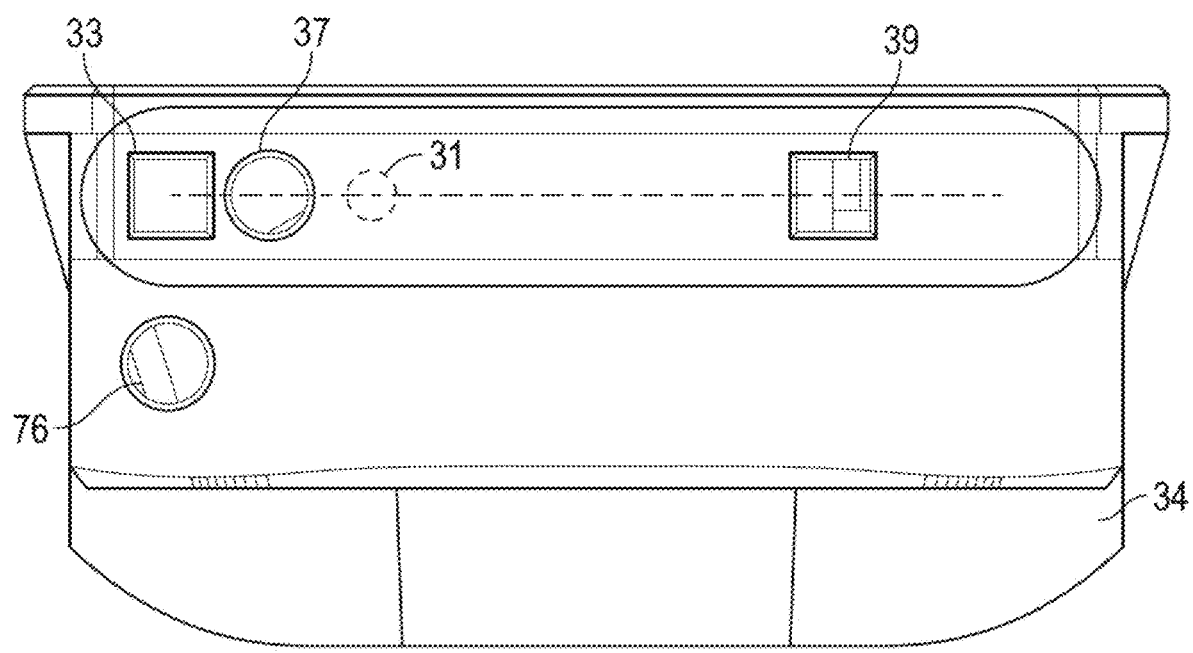
FIG. 13 is an enlarged view of a portion of the second end of FIG. 7.

Referring now to FIG. 10 with continuing reference to FIGS. 6-14, elements are shown of the system 30 with the mobile device 43 installed or coupled to the housing 32. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, camera 60 and IMU 74 into a digital signal to determine a distance from the system 30 to an object in the environment. In an embodiment, the camera 60 is a 3D or RGBD type camera. Controller 68 uses the digital signals that act as input to various processes for controlling the system 30. The digital signals represent one or more system 30 data including but not limited to distance to an object, images of the environment, acceleration, pitch orientation, yaw orientation and roll orientation. As will be discussed in more detail, the digital signals may be from components internal to the housing 32 or from sensors and devices located in the mobile device 43.

In general, when the mobile device 43 is not installed, controller 68 accepts data from 2D scanner 50 and IMU 74 and is given certain instructions for the purpose of generating a two-dimensional map of a scanned environment. Controller 68 provides operating signals to the 2D scanner 50, the camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on the mobile device 43.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods embodied in application code shown or described with reference to FIGS. 15-18 and FIG. 23. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

In the embodiment shown in FIGS. 6-9, the system 30 further includes a camera 60 that is a 3D or RGB-D camera. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31 (FIG. 13), a left infrared camera 33, a right infrared camera 39, and a color camera 37. In an embodiment, the 3D camera 60 is a RealSense™ camera model R200 manufactured by Intel Corporation.

In an embodiment, when the mobile device 43 is coupled to the housing 32, the mobile device 43 becomes an integral part of the system 30. In an embodiment, the mobile device 43 is a cellular phone, a tablet computer or a personal digital assistant (PDA). The mobile device 43 may be coupled for communication via a wired connection, such as ports 1400, 1402. The port 1400 is coupled for communication to the processor 78, such as via I/O controller 90 for example. The ports 1400, 1402 may be any suitable port, such as but not limited to USB, USB-A, USB-B, USB-C, IEEE 1394 (Firewire), or Lightning™ connectors.

The mobile device 43 is a suitable electronic device capable of accepting data and instructions, executing the instructions to process the data, and presenting the results. The mobile device 43 includes one or more processing elements 1404. The processors may be microprocessors, field programmable gate arrays (FPGAs), digital signal processors (DSPs), and generally any device capable of performing computing functions. The one or more processors 1404 have access to memory 106 for storing information.

The mobile device 43 is capable of converting the analog voltage or current level provided by sensors 1408 and processor 78. Mobile device 43 uses the digital signals that act as input to various processes for controlling the system 30. The digital signals represent one or more system 30 data including but not limited to distance to an object, images of the environment, acceleration, pitch orientation, yaw orientation, roll orientation, global position, ambient light levels, and altitude for example.

In general, mobile device 43 accepts data from sensors 108 and is given certain instructions for the purpose of generating or assisting the processor 78 in the generation of a two-dimensional map or three-dimensional map of a scanned environment. Mobile device 43 provides operating signals to the processor 78, the sensors 1408 and a display 1410. Mobile device 43 also accepts data from sensors 1408, indicating, for example, to track the position of the mobile device 43 in the environment or measure coordinates of points on surfaces in the environment. The mobile device 43 compares the operational parameters to predetermined variances (e.g. yaw, pitch or roll thresholds) and if the predetermined variance is exceeded, may generate a signal. The data received by the mobile device 43 may be displayed on display 110. In an embodiment, the display 1410 is a touch screen device that allows the operator to input data or control the operation of the system 30.

The controller 68 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(˜) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 1404 are coupled to memory 1406. The memory 1406 may include random access memory (RAM) device, a non-volatile memory (NVM) device, and a read-only memory (ROM) device. In addition, the processors 1404 may be connected to one or more input/output (I/O) controllers 1412 and a communications circuit 1414. In an embodiment, the communications circuit 1414 provides an interface that allows wireless or wired communication with one or more external devices or networks, such as the LAN or the cellular network discussed above.

Controller 68 includes operation control methods embodied in application code shown. These methods are embodied in computer instructions written to be executed by processors 78, 104, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 1404 are the sensors 1408. The sensors 1408 may include but are not limited to: a microphone 1416; a speaker 1418; a front or rear facing camera 1420; accelerometers 122 (inclinometers), gyroscopes 1424, a magnetometers or compass 1426; a global positioning satellite (GPS) module 1428; a barometer 1430; a proximity sensor 1432; and an ambient light sensor 1434. By combining readings from a combination of sensors 1408 with a fusion algorithm that may include a Kalman filter, relatively accurate position and orientation measurements can be obtained.

It should be appreciated that the sensors 60, 74 integrated into the scanner 30 may have different characteristics than the sensors 1408 of mobile device 43. For example, the resolution of the cameras 60, 1420 may be different, or the accelerometers 94, 1422 may have different dynamic ranges, frequency response, sensitivity (mV/g) or temperature parameters (sensitivity or range). Similarly, the gyroscopes 96, 1424 or compass/magnetometer may have different characteristics. It is anticipated that in some embodiments, one or more sensors 1408 in the mobile device 43 may be of higher accuracy than the corresponding sensors 74 in the system 30. As described in more detail herein, in some embodiments the processor 78 determines the characteristics of each of the sensors 1408 and compares them with the corresponding sensors in the system 30 when the mobile device. The processor 78 then selects which sensors 74, 1408 are used during operation. In some embodiments, the mobile device 43 may have additional sensors (e.g. microphone 1416, camera 1420) that may be used to enhance operation compared to operation of the system 30 without the mobile device 43. In still further embodiments, the system 30 does not include the IMU 74 and the processor 78 uses the sensors 1408 for tracking the position and orientation/pose of the system 30. In still further embodiments, the addition of the mobile device 43 allows the system 30 to utilize the camera 1420 to perform three-dimensional (3D) measurements either directly (using an RGB-D camera) or using photogrammetry techniques to generate 3D maps. In an embodiment, the processor 78 uses the communications circuit (e.g. a cellular 4G interne connection) to transmit and receive data from remote computers or devices.

In the exemplary embodiment, the system 30 is a handheld portable device that is sized and weighted to be carried by a single person during operation. Therefore, the plane 2136 (FIG. 22) in which the 2D scanner 50 projects a light beam may not be horizontal relative to the floor or may continuously change as the computer moves during the scanning process. Thus, the signals generated by the accelerometers 94, gyroscopes 96 and compass 98 (or the corresponding sensors 1408) may be used to determine the pose (yaw, roll, tilt) of the system 30 and determine the orientation of the plane 51.

In an embodiment, it may be desired to maintain the pose of the system 30 (and thus the plane 2136) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 138 that activates a vibration motor 140. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 2136 to be within 10-15 degrees of horizontal (relative to the ground) about the yaw, roll and pitch axes.

Figure 15:
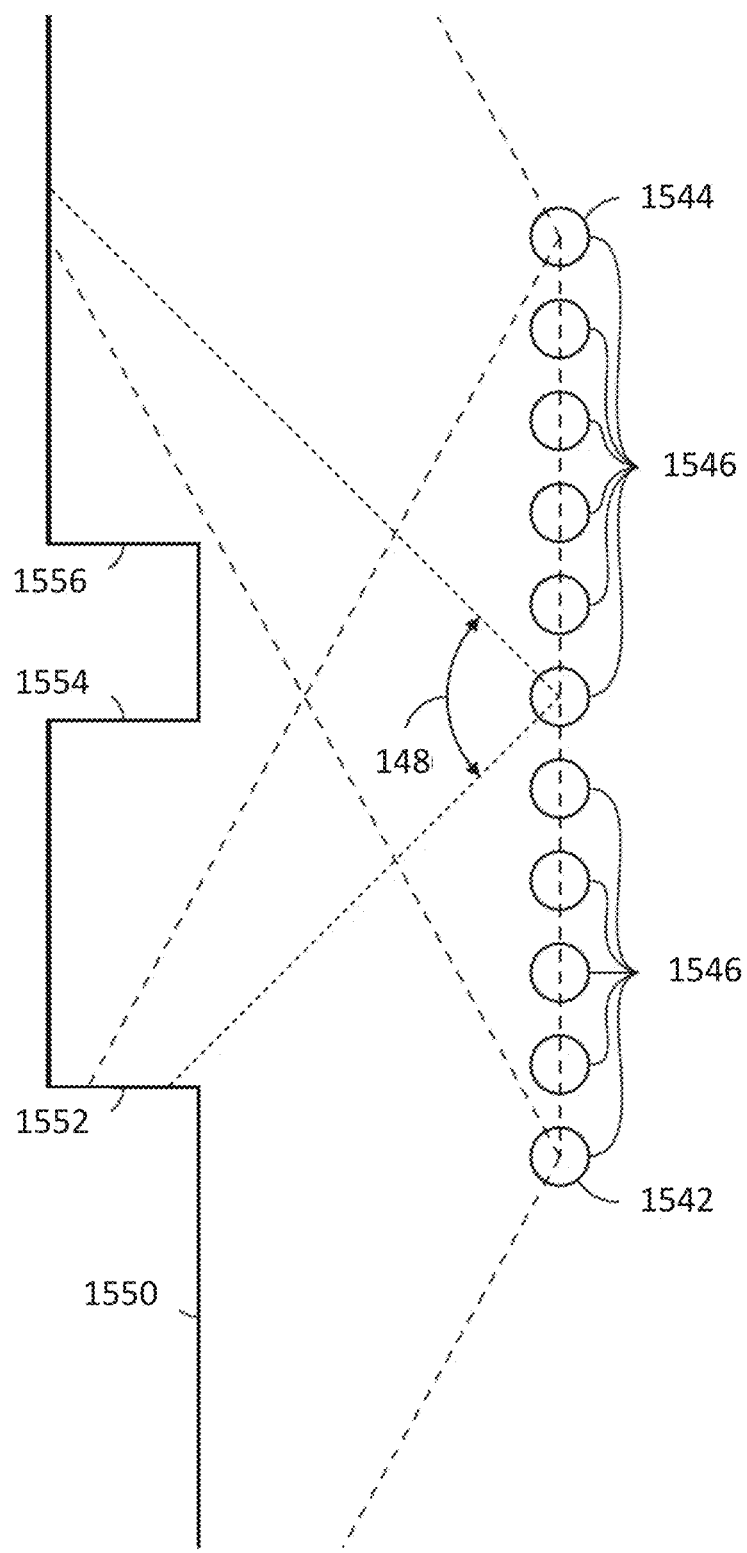
FIGS. 15-17 are schematic illustrations of the operation of system of FIG. 9 in accordance with an embodiment.

In an embodiment, the 2D scanner 50 makes measurements as the system 30 is moved about an environment, such from a first position 1542 to a second registration position 1544 as shown in FIG. 15. In an embodiment, 2D scan data is collected and processed as the system 30 passes through a plurality of 2D measuring positions 1546. At each measuring position 1546, the 2D scanner 50 collects 2D coordinate data over an effective FOV 1548. Using methods described in more detail below, the controller 68 uses 2D scan data from the plurality of 2D scans at positions 1546 to determine a position and orientation of the system 30 as it is moved about the environment. In an embodiment, the common coordinate system is represented by 2D Cartesian coordinates x, y and by an angle of rotation $\theta$ relative to the x or y axis. In an embodiment, the x and y axes lie in the plane of the 2D scanner and may be further based on a direction of a "front" of the 2D scanner 50.

Figure 16:
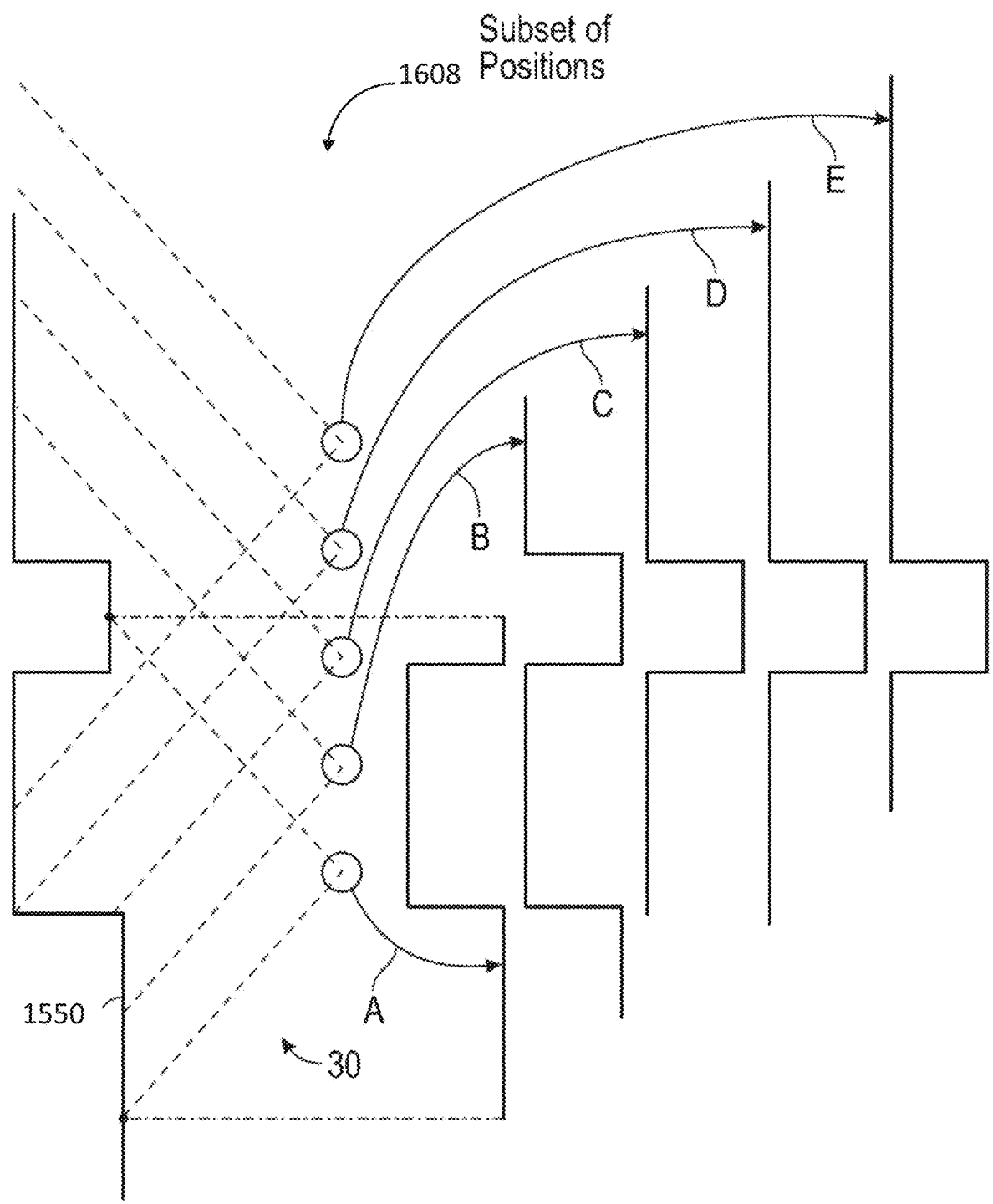
Figures 17, 18:
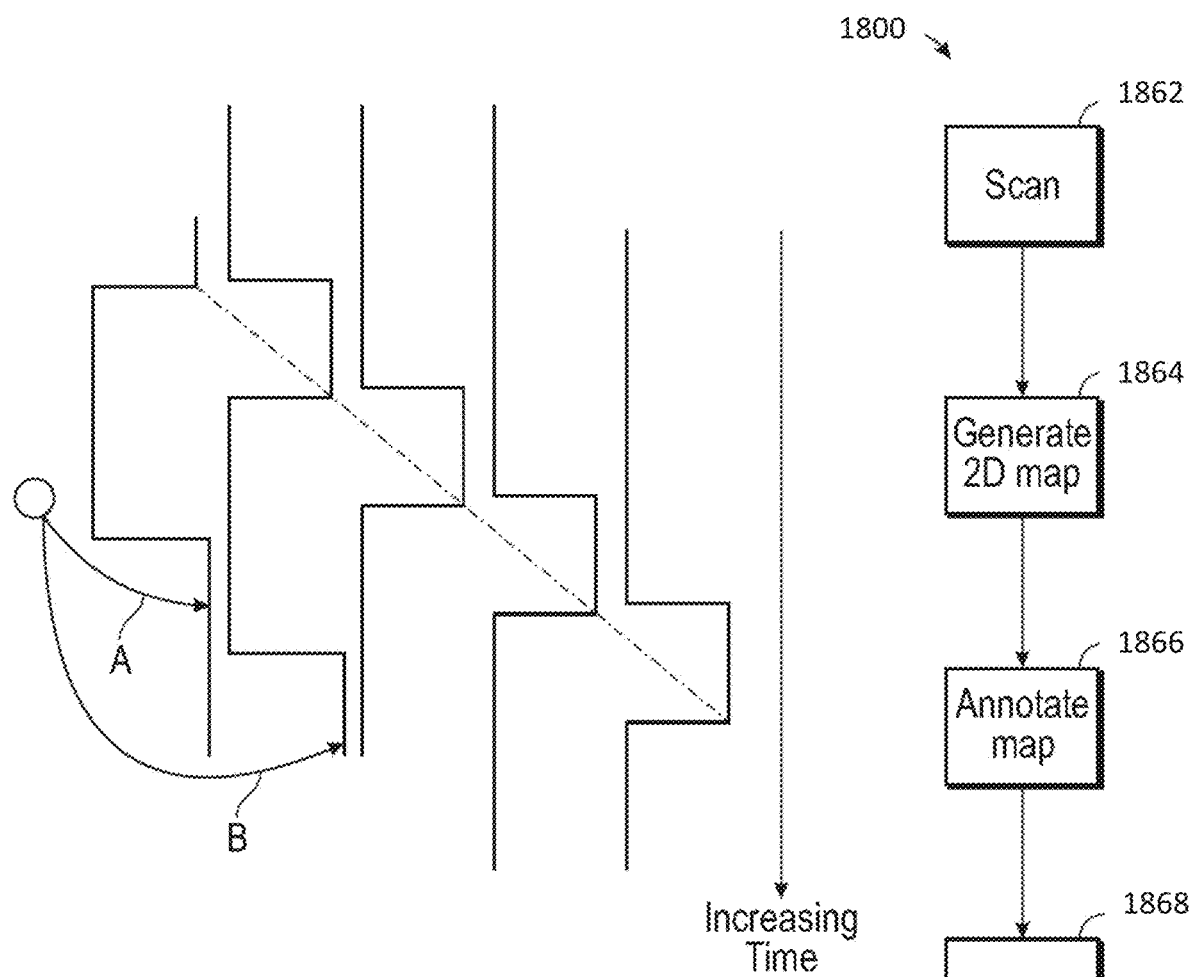
FIG. 18 is a flow diagram of a method of generating a two-dimensional map of an environment.

FIG. 16 shows the 2D system 30 collecting 2D scan data at selected positions 1608 over an effective FOV 110. At different positions 146, the 2D scanner 50 captures a portion of the object 1550 marked A, B, C, D, and E. FIG. 17 shows 2D scanner 50 moving in time relative to a fixed frame of reference of the object 1550.

FIG. 17 includes the same information as FIG. 16 but shows it from the frame of reference of the system 30 rather than the frame of reference of the object 1550. FIG. 17 illustrates that in the system 30 frame of reference, the position of features on the object change over time. Therefore, the distance traveled by the system 30 can be determined from the 2D scan data sent from the 2D scanner 50 to the controller 68.

As the 2D scanner 50 takes successive 2D readings and performs best-fit calculations, the controller 68 keeps track of the translation and rotation of the 2D scanner 50, which is the same as the translation and rotation of the system 30. In this way, the controller 68 is able to accurately determine the change in the values of x, y, $\theta$ as the system 30 moves from the first position 1542 to the second position 1544.

In an embodiment, the controller 68 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 1552, 1554, and 1556 shown in FIG. 15. The mathematical criterion may involve processing of the raw data provided by the 2D scanner 50 to the controller 68, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 2136 of the light beam from 2D scanner 50 remains horizontal relative to the ground plane, the first translation value is dx, the second translation value is dy, and the first rotation value dθ. If the first scan data is collected with the 2D scanner 50 having translational and rotational coordinates (in a reference coordinate system) of $(x_1, y_1, \theta_1)$, then when the second 2D scan data is collected at a second location the coordinates are given by $(x_2, y_2, \theta_2) = (x_1 + dx, y_1 + dy, \theta_1 + d\theta)$. In an embodiment, the controller 68 is further configured to determine a third translation value (for example, dz) and a second and third rotation values (for example, pitch and roll). The third translation value, second rotation value, and third rotation value may be determined based at least in part on readings from the IMU 74.

The 2D scanner 50 collects 2D scan data starting at the first position 1542 and more 2D scan data at the second position 1544. In some cases, these scans may suffice to determine the position and orientation of the system 30 at the second position 1544 relative to the first position 1542. In other cases, the two sets of 2D scan data are not sufficient to enable the controller 68 to accurately determine the first translation value, the second translation value, and the first rotation value. This problem may be avoided by collecting 2D scan data at intermediate scan positions 1546. In an embodiment, the 2D scan data is collected and processed at regular intervals, for example, once per second. In this way, features in the environment are identified in successive 2D scans at positions 1546. In an embodiment, when more than two 2D scans are obtained, the controller 68 may use the information from all the successive 2D scans in determining the translation and rotation values in moving from the first position 1542 to the second position 1544. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the system 30 is moved beyond the second position 144, a two-dimensional image or map of the environment being scanned may be generated.

Referring now to FIG. 18, a method 1800 is shown for generating a two-dimensional map with annotations. The method 1800 starts in block 1862 where the facility or area is scanned to acquire scan data 1970, such as that shown in FIG. 19. The scanning is performed by carrying the system 30 through the area to be scanned. The system 30 measures distances from the system 30 to an object, such as a wall for example, and also a pose of the system 30 in an embodiment the user interacts with the system 30 via actuator 38. In the illustrated embodiments, the mobile device 43 provides a user interface that allows the operator to initiate the functions and control methods described herein. Using the registration process desired herein, the two dimensional locations of the measured points on the scanned objects (e.g. walls, doors, windows, cubicles, file cabinets etc.) may be determined. It is noted that the initial scan data may include artifacts, such as data that extends through a window 1972 or an open door 1974 for example. Therefore, the scan data 1970 may include additional information that is not desired in a 2D map or layout of the scanned area.

Figure 19:
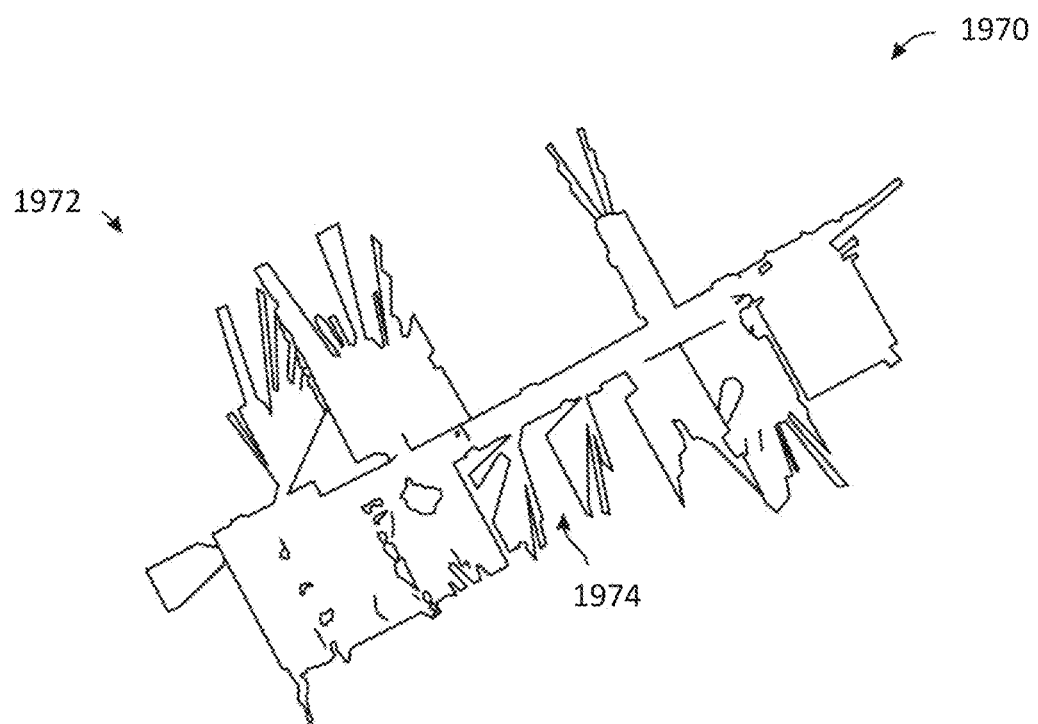
FIGS. 19 and 20 are plan views of stages of a two-dimensional map generated with the method of FIG. 14 in accordance with an embodiment.
Figure 20:
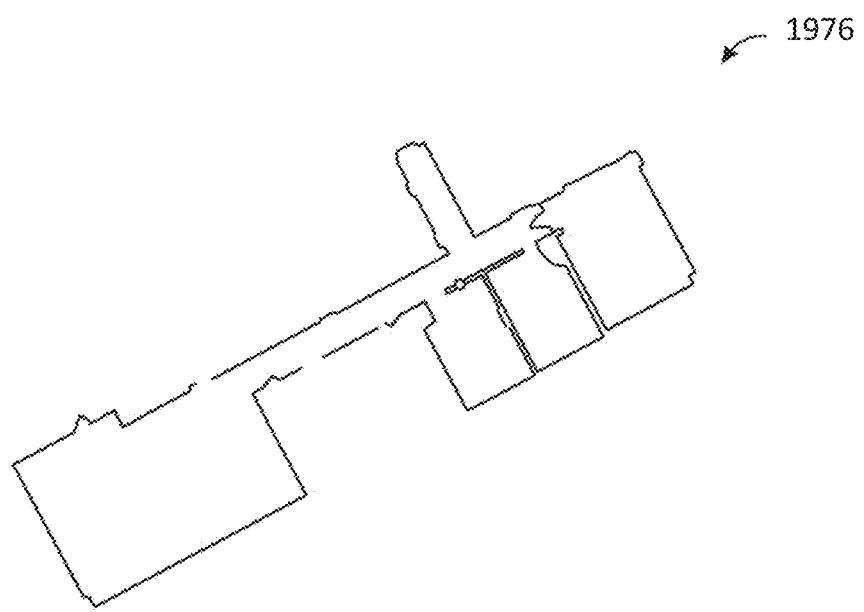

The method 1800 then proceeds to block 1864 where a 2D map 1976 is generated of the scanned area as shown in FIG. 19. The generated 2D map 1976 represents a scan of the area, such as in the form of a floor plan without the artifacts of the initial scan data. It should be appreciated that the 2D map 1976 may be utilized directly by an architect, interior designer or construction contractor as it represents a dimensionally accurate representation of the scanned area. In the embodiment of FIG. 1866, the method 1800 then optionally proceeds to block 1866 where optional user-defined annotations are made to the 2D maps 1976 to define an annotated 2D map that includes information, such as dimensions of features, the location of doors, the relative positions of objects (e.g. liquid oxygen tanks, entrances/exits or egresses or other notable features such as but not limited to the location of automated sprinkler systems, knox or key boxes, or fire department connection points ("FDC"). In some geographic regions, public safety services such as fire departments may keep records of building or facility layouts for use in case of an emergency as an aid to the public safety personnel in responding to an event. It should be appreciated that these annotations may be advantageous in alerting the public safety personnel to potential issues they may encounter when entering the facility, and also allow them to quickly locate egress locations.

Once the annotations of the 2D annotated map are completed, the method 1800 then proceeds to block 1868 where the 2D map is stored in memory, such as nonvolatile memory 86 for example. The 2D map may also be stored in a network accessible storage device or server so that it may be accessed by the desired personnel.

Figure 21:
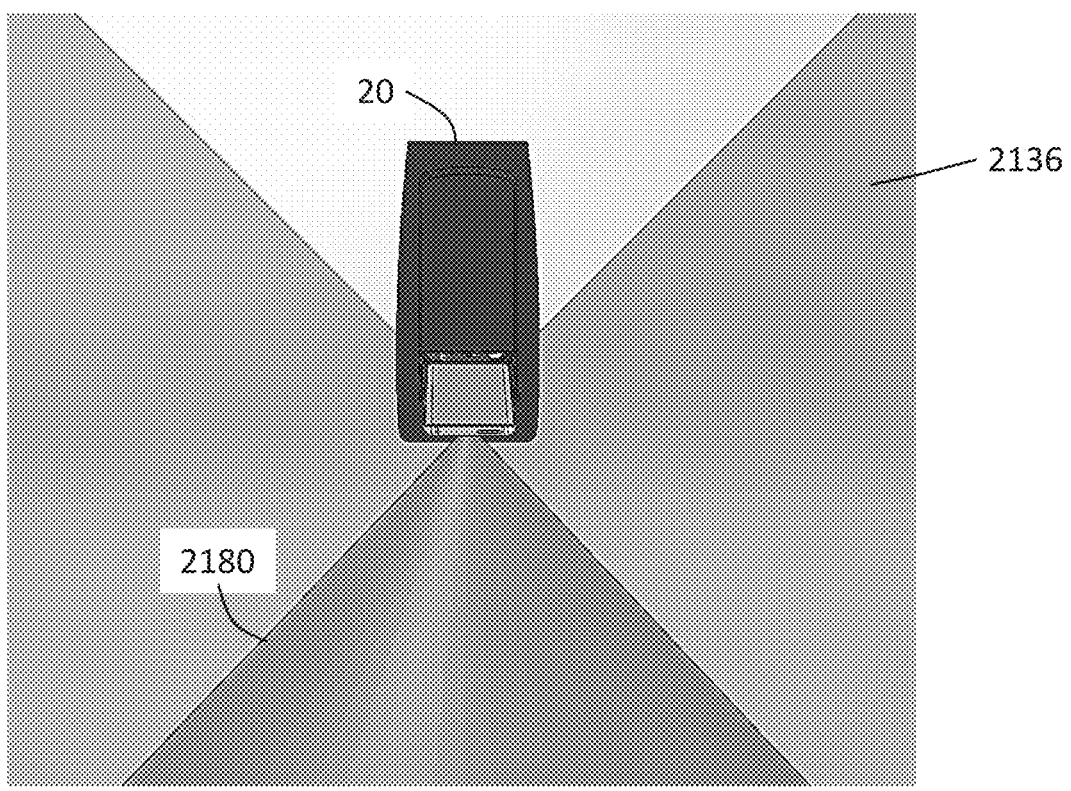
FIGS. 21 and 22 are schematic views of the operation of the system of FIG. 9 in accordance with an embodiment.
Figure 22:
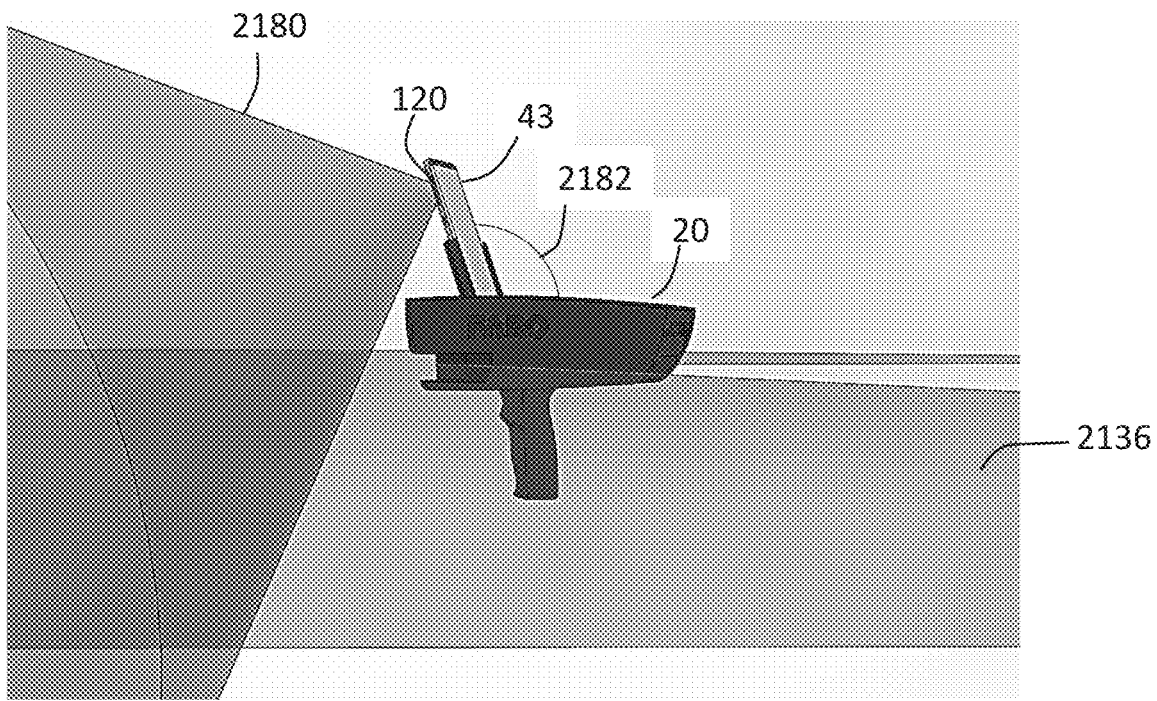

Referring now to FIG. 21 and FIG. 22 an embodiment is illustrated with the mobile device 43 coupled to the system 20. As described herein, the 2D scanner 50 emits a beam of light in the plane 2136. The 2D scanner 50 has a field of view (FOV) that extends over an angle that is less than 360 degrees. In the exemplary embodiment, the FOV of the 2D scanner is about 270 degrees. In this embodiment, the mobile device 43 is coupled to the housing 32 adjacent the end where the 2D scanner 50 is arranged. The mobile device 43 includes a forward facing camera 1420. The camera 1420 is positioned adjacent a top side of the mobile device and has a predetermined field of view 2180. In the illustrated embodiment, the holder 41 couples the mobile device 43 on an obtuse angle 2182. This arrangement allows the mobile device 43 to acquire images of the floor and the area directly in front of the system 20 (e.g. the direction the operator is moving the system 20).

In embodiments where the camera 1420 is a RGB-D type camera, three-dimensional coordinates of surfaces in the environment may also be directly determined in a mobile device coordinate frame of reference. In an embodiment, the holder 41 allows for the mounting of the mobile device 43 in a stable position (e.g. no relative movement) relative to the 2D scanner 50. When the mobile device 43 is coupled to the housing 32, the processor 78 performs a calibration of the mobile device 43 allowing for a fusion of the data from sensors 1408 with the sensors of system 20. As a result, the coordinates of the 2D scanner may be transformed into the mobile device coordinate frame of reference or the 3D coordinates acquired by camera 1420 may be transformed into the 2D scanner coordinate frame of reference.

In an embodiment, the mobile device is calibrated to the 2D scanner 50 by assuming the position of the mobile device based on the geometry and position of the holder 41 relative to 2D scanner 50. In this embodiment, it is assumed that the holder that causes the mobile device to be positioned in the same manner. It should be appreciated that this type of calibration may not have a desired level of accuracy due to manufacturing tolerance variations and variations in the positioning of the mobile device 43 in the holder 41. In another embodiment, a calibration is performed each time a different mobile device 43 is used. In this embodiment, the user is guided (such as via the user interface 1410) to direct the system 30 to scan a specific object, such as a door, that can be readily identified in the laser readings of the system 30 and in the camera-sensor 1420 using an object recognition method.

Figure 23:
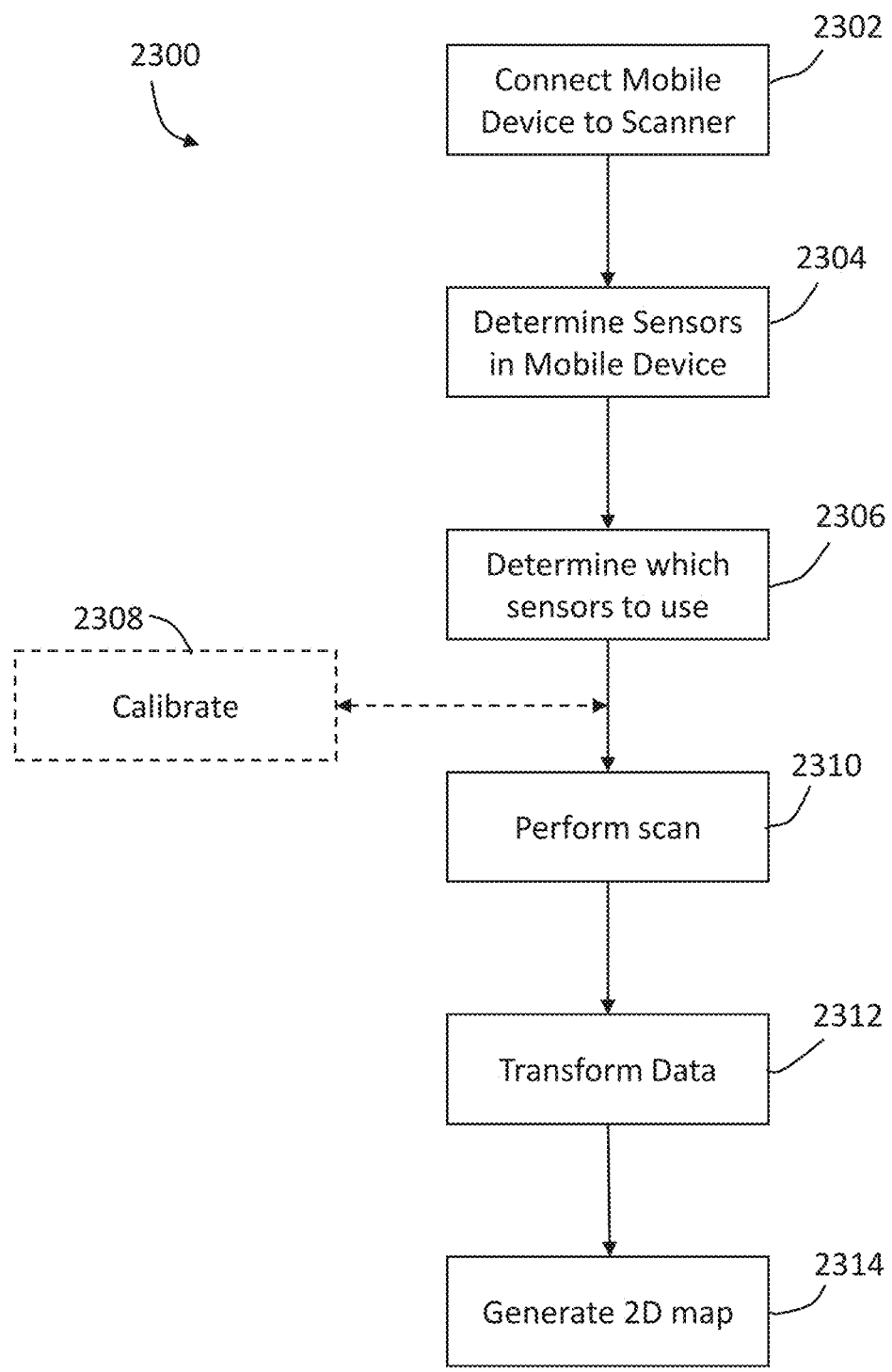
FIG. 23 is a flow diagram of a method of generating a two-dimensional map using the system of FIG. 9 in accordance with an embodiment.

Referring now to FIG. 23, a method 2300 is provided for generating a 2D map of an environment. The method 2300 begins in block 2302 where the operator couples the mobile device 43 to the holder 41. In an embodiment, the coupling includes forming a communication connection between the processor 78 and the processor 104. This communication connection allows the processors 78, 104 to exchange data, including sensor data, therebetween. The method 2300 then proceeds to block 2304 where information regarding the sensors 1408 is transmitted to the processor 78. The information transmitted includes the type of sensors (e.g. accelerometer) and performance characteristics or parameters of the sensor (e.g. dynamic range, frequency response, sensitivity (mV/g) temperature sensitivity, or temperature range).

The method 2300 then proceeds to block 2306 where the processor 78 compares the sensors 1408 with the corresponding sensors in the system 20. In an embodiment, this comparison includes comparing performance characteristics or parameters and determining which sensor would provide a desired accuracy of the scan. It should be appreciated that this comparison is performed on a sensor by sensor basis. In some embodiments, the data used for tracking and pose may be a combination of the sensors from the mobile device 43 and the system 20. For example, the accelerometer 1422 may be used in combination with the gyroscope 96 and compass 98 for determining tracking and pose.

In an embodiment, once the sensors are selected the method 2300 a calibration step is performed in block 2308. As discussed herein, the calibration step allows the transforming of data between the mobile device coordinate frame of reference and the 2D scanner coordinate frame of reference.

The method 2300 then proceeds to block 2310 where the scan is performed by moving the system 20 (with mobile device 43 attached) about the environment. As the scan is being performed (e.g. the 2D scanner is emitting and receiving reflected light and determining distances), the method 200 transforms the data in block 2312 into a common frame of reference, such as the 2D scanner frame of reference for example, so that coordinates of the points of surfaces in the environment may be determined. As the scan is being performed, the position and pose of the system 20 is determined on a periodic, aperiodic or continuous basis as described herein.

Once the scan is completed, the method 2300 proceeds to block 2314 where the 2D map is generated of the scanned area. It should be appreciated that in embodiments where the camera 1420 is a 3D camera or RGB-D type camera, a 3D map of the environment may be generated.

It should be appreciated that while embodiments herein describe the performance of operational control methods by the processor 78, this is for exemplary purposes and the claims should not be so limited. In other embodiments, the operation control methods may be performed by the processor 1404 or a combination of the processor 78 and the processor 104.

In one or more embodiments of the invention, a 2D scanner such as the 2D scanner 30 described above is used to obtain a 2D map for automatically generating scan locations for the laser scanner 120.

Figure 24:
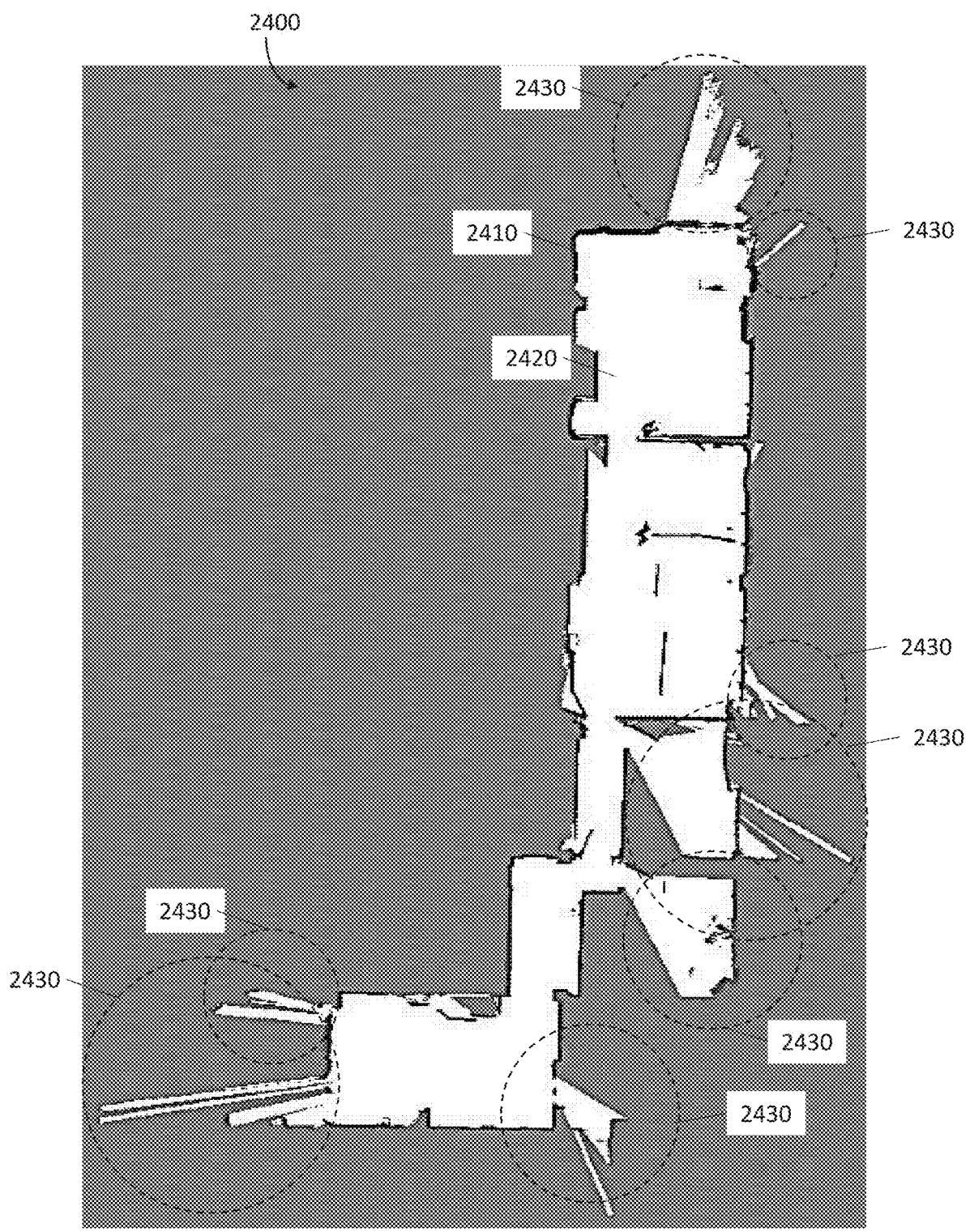
FIG. 24 depicts a map used for automatically generating scanning locations in accordance with an embodiment.

FIG. 24 depicts a 2D map 2400 of the environment that has been obtained. In some embodiments of the invention, the 2D map 2400 is generated using the system 30 described above. In other embodiments, the 2D map 2400 can be input or downloaded to the system from one or more sources, such as but not limited to paper floorplans or CAD models for example.

As shown, the 2D map 2400 provides a floorplan-type map of the environment including boundaries such as walls 2410 or other objects that surround an open area or space 2420 (e.g. a room). Also, the 2D map 2400 can include noise 2430 that can be detected from light from open doors, windows, or other sources from the environment. The noise 2420 can also be identified within the 2D map 2400 and determined as such when a small number of dark or black pixels are identified. In some embodiments of the invention, the identified noise in the 2D map 2400 can be identified and filtered from the 2D map 2400.

The 2D map 2400 in FIG. 24 is provided as a grayscale map. In some embodiments, the grayscale map data can be binarized to reduce the complexity of the map similar to that shown in FIG. 25. The map is displayed in black and white pixels which represent the vacant pixels and non-vacant pixels.

In some embodiments, the size of the 2D map 2400 can be reduced. For example, a 2D map having a resolution of 1000×500 can be scaled to 500×250. This allows the entire method to be performed considerably fast even when larger maps are processed.

Figure 25:
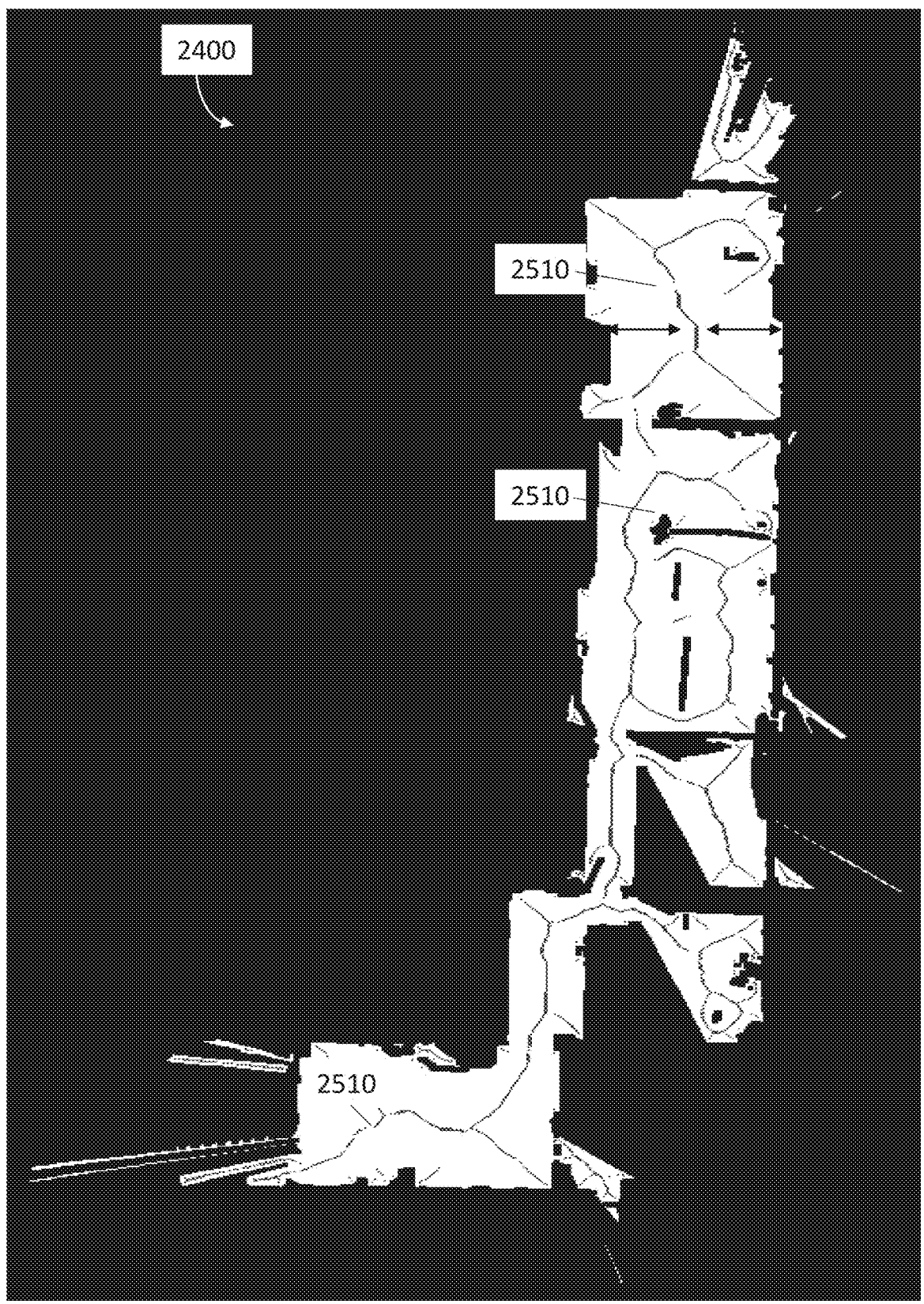
FIG. 25 depicts a map including a path generated from a distance transform used to automatically generate scan locations in accordance with an embodiment.

With reference now to FIG. 25, the 2D map 2400 is further processed and binarized where the black pixels represent occupied areas such as walls, obstacles, or objects, and the white pixels represent non-occupied areas (e.g. open areas, hallways or rooms) of the map. In this example, the 2D map 2400 has been binarized, and some noise reduction and filtering has been applied to the 2D map 2400. FIG. 25 also provides a path 2510 that was computed using a distance transform. The path 2510 that is computed by the distance transform provides a path 2510 that is the maximum distance from the nearest object. In one or more embodiments of the invention, the distance transform is based on a computed Voronoi Diagram of the 2D map. The path 2510 provides a set of candidate scan locations that can be used to select scan locations in accordance with one or more embodiments of the invention. In one or more embodiments, the distance to the nearest object is a configurable parameter that can be configured by a user.

Figure 26:
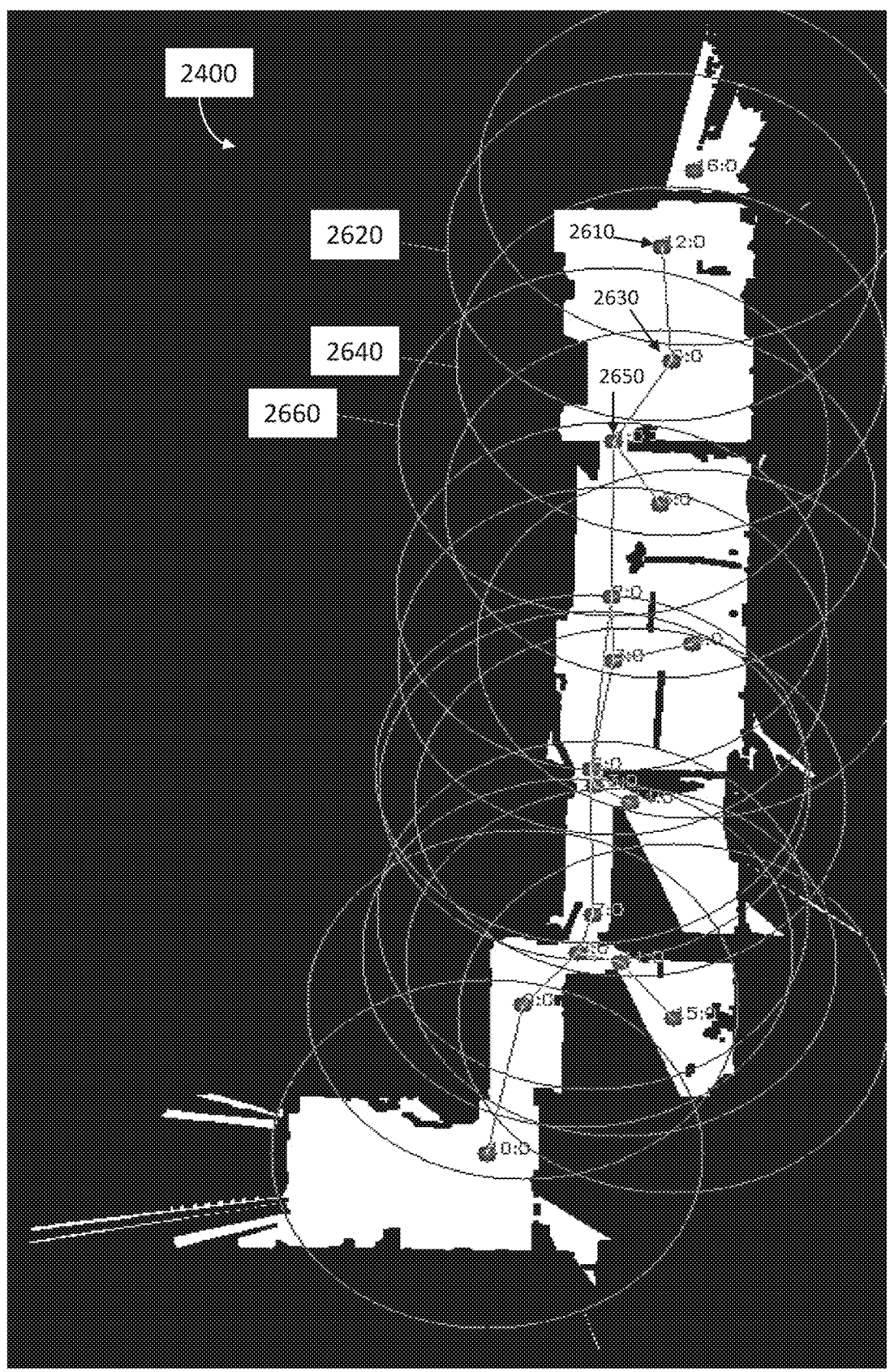
FIG. 26 depicts the map including scanning ranges of the scanning device used for automatically generate scan locations in accordance with an embodiment.

Now referring to FIG. 26, the map 2400 as shown provides the result of additional processing and analysis in accordance with one or more embodiments of the invention. In one or more embodiments of the invention, an initial point is selected in the 2D map by selecting the closest point to the origin of the map that belongs to the Voronoi diagram. Shown on the map 2400 are a number of points 2610, 2630, and 2650 that are selected from the set of candidate scan locations. Responsive to selecting the initial scan location or point, equally distanced scan locations can be selected from the path over the map. In some embodiments, the distance between each scan point can be configured by a user. That is, each of the points are selected from points on the path 2510. For each point, a scanning visibility range (e.g. the maximum range at which a distance can be measured) associated with a scanner device, represented as a circle is determined and shown in FIG. 26. In the provided illustration, the range 2620 corresponds to the point 2610, the range 2640 corresponds to the point 2630, and the range 2660 corresponds to the point 2650. The circle can be user-defined range of the scanning device. In other embodiments, the scanning range can be a default value or a configurable value. The scanning range may be different based on the particular scanning device that will be used to perform the measurements. The maximum visibility range can be automatically detected from the scanner device or a user can manually insert the visibility range of the scanner device. The scanning visibility range is computed iteratively for each candidate scan location of the path 2510. The scanning visibility range for each candidate scan location of the path 2510 can be computed in a simultaneous or sequential manner.

Next, the visibility within the FOV of the scanner device is determined. A ray tracing model can be used to perform a count of pixels wherein a ray is traced from the center of the circle representing the visibility range of the scanning device to the edge of the circle to count the visible pixels. This allows the system to simulate which parts are visible by the scanner device from the current scanning location. The non-occupied pixels in the FOV of the scanner device are marked and counted within each circle. That is, the number of visible pixels (non-occupied pixel) is counted and the number of times each of the visible pixels are observed from the different scan locations on the path are considered. Each of the visible pixels is marked in order to identify the overlap between adjacent scan locations corresponding to visible pixels of other scanning ranges of other scan locations. In some embodiments, the walls or obstacles are inflated by adding a specified number of pixels the walls or obstacles to further refine the results and reduce noise in the map.

Subsequent scanning locations are selected based on the computed Voronoi diagram and a configurable overlap threshold. The overlap threshold representing the overlap (e.g. based on the number of counts of the associated pixels) of a first scan location with at least one adjacent scan can be used to select subsequent scan locations. In one or more embodiments of the invention, a configurable overlap threshold is set by a user. In other embodiments, the overlap threshold can be a default overlap threshold. The candidate scan locations that achieves the overlap criteria are identified and selected for the scan locations. The subsequently selected scanning locations must be a distance (configurable distance) away from the previous scan location that ensures the overlap between the field of view coverage of the scanning locations meets the overlap threshold. In addition, the scanning location must also belong to the path defined by the Voronoi diagram. In the event the overlap of visible pixels of a first scan location and a second scan location fails to meet the overlap threshold, sufficient coverage of the area may not be obtained and a different scan location may be selected to achieve the requisite coverage. In the event the overlap of visible pixels of the first point and second point far exceeds the overlap threshold, the two points may be closer than desired for complete coverage which reproduces scan data that may not be needed. Therefore, another point along the path 2510 that is located a distance away from each of the points may be selected to obtain an efficient scanner location placement. In this illustration, the points 2610 and 2630 achieve the desired overlap threshold and the points 2630 and 2650 also achieve the overlap threshold. The process is repeated for each of the points along the path 2510 to determine the scan locations for the laser scanner 120 in the environment.

Although, in the example described above a first, second, and third point were described, it should be understood that any number of points can be analyzed and compared with other points to determine a point having the threshold overlap to obtain maximum coverage of the environment.

The identified set of scan locations can be presented to the user where the identified set of scan locations are identified as a minimum set of scan locations to ensure complete coverage when performing modeling of the 3D scanning device. In some embodiments, the user may manually add additional scan locations to the set of scan locations.

In the event there are unscanned areas or gaps in coverage of the map, the current coverage is compared to an unscanned area threshold. If the current coverage of the map is below the unscanned area threshold, additional scan locations can be added to ensure sufficient coverage of the map is obtained. In some embodiments, the additional scan locations are added by the user, and in other embodiments, the system can determine scan locations based on the current areas of the map.

Figure 27:
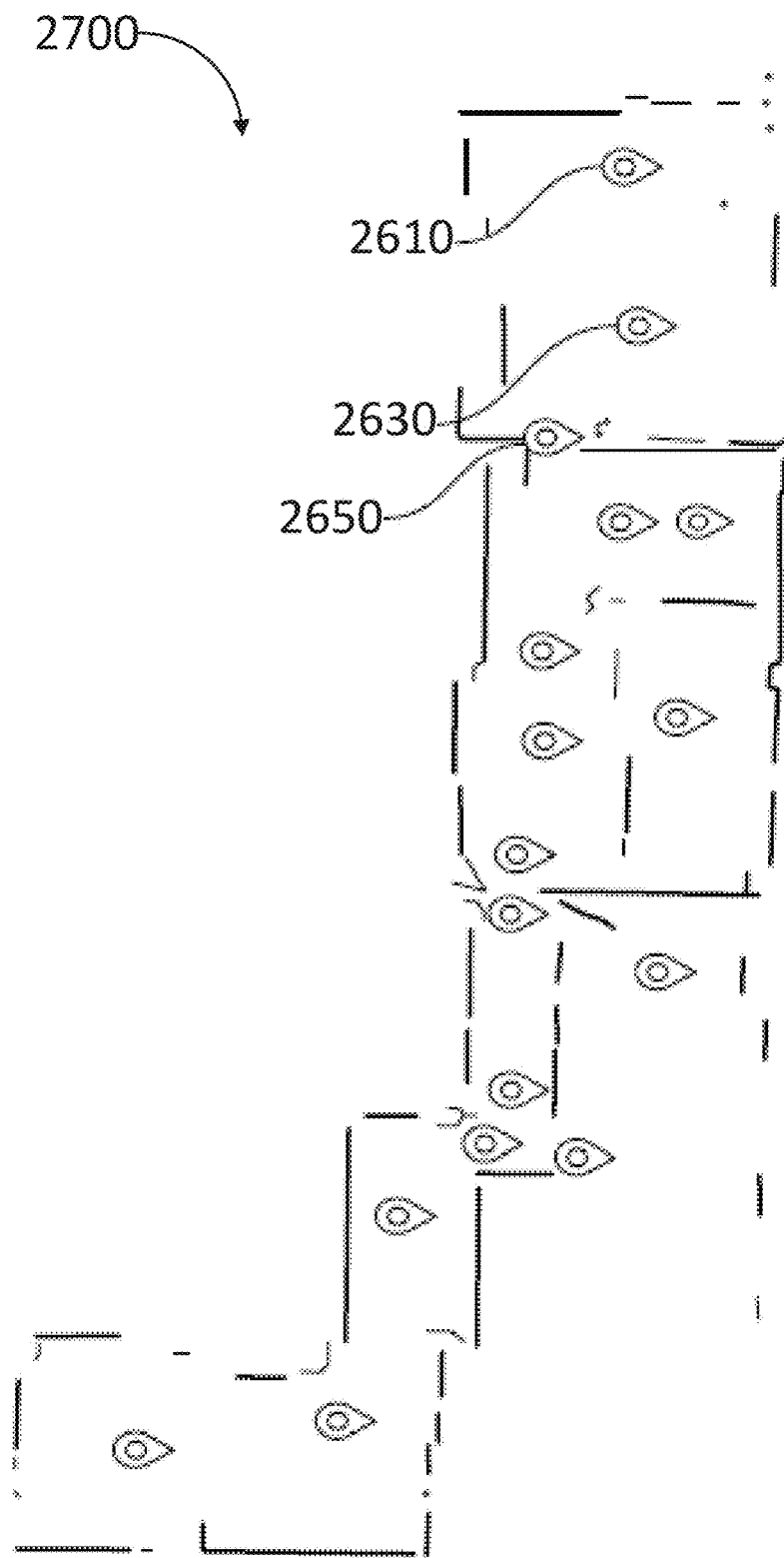
FIG. 27 depicts the identified locations to perform a 3D scan based on the automatically generated scan locations in accordance with an embodiment.

FIG. 27 depicts an example display of a map after performing the automatic generation of scan locations to develop a scan plan for an environment in accordance with one or more embodiments. Each point or pin identifies a scan location where the set of scan locations ensures maximum coverage of the environment to enable 3D modeling of the environment with a reduced or minimal number of scans. The set of scan location have been identified to provide sufficient overlap where each of the individual scans will be subsequently registered together to reproduce the complete environment.

In this illustration, the points 2610, 2630, and 2650 are included in the set of points that are provided to the user because each scan location includes a threshold count of non-occupied pixels and the neighboring points achieve an overlap threshold. In one or more embodiments of the invention, the scanner is able to perform a re-localization feature that can be used to guide users to the calculated scanning points after performing the method 2600 discussed with reference to FIG. 28 above.

Figure 28:
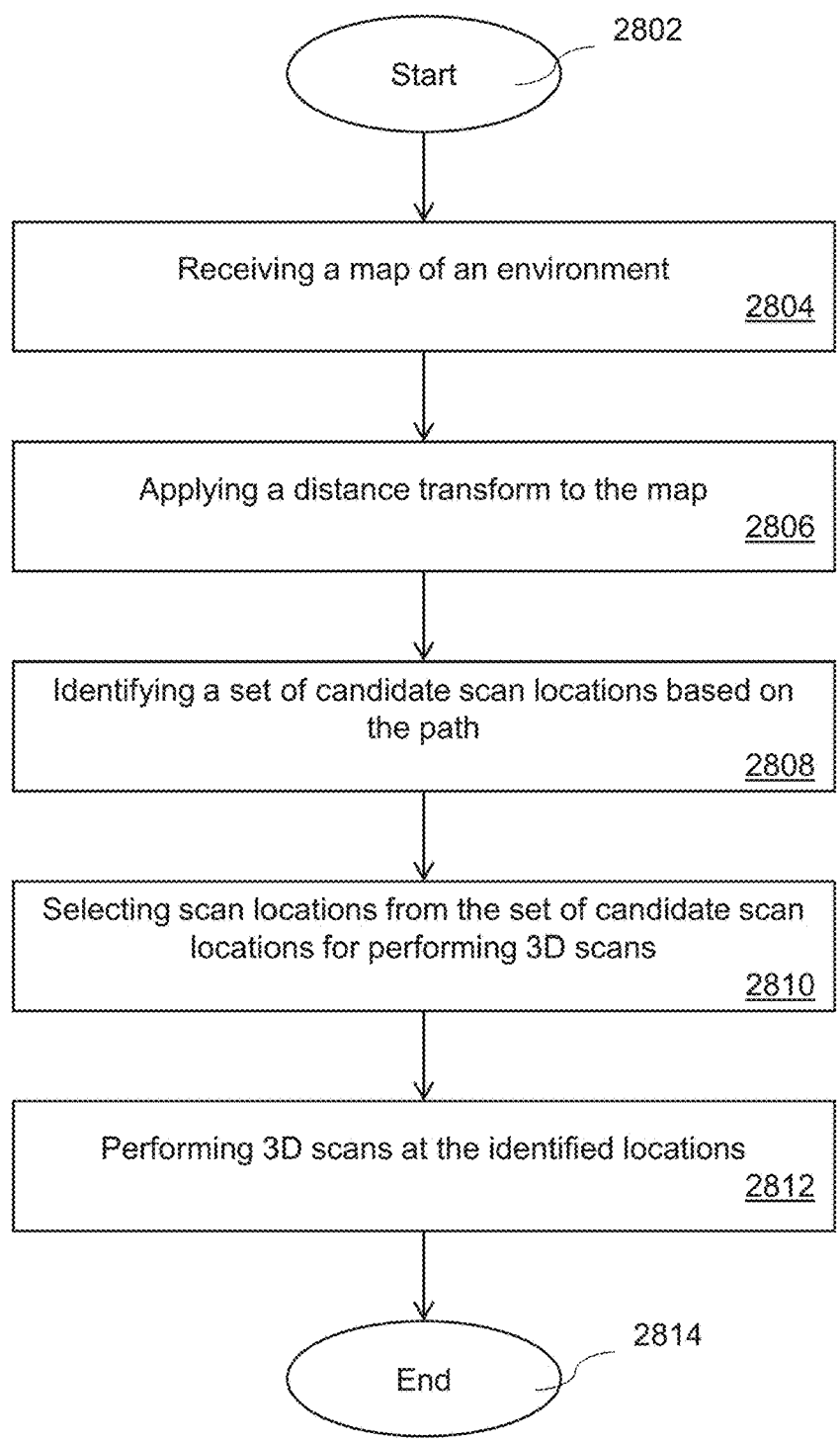
FIG. 28 is a flow diagram of a method of automatically generating scan locations in accordance with an embodiment.

Now referring to FIG. 28, a method 2800 for the automatic generation of a scan plan for an environment in accordance with one or more embodiments is provided. The method 2800 can be performed using one or more processors and/or processing systems described above. The method 2800 begins at block 2802 and proceeds to block 2804 which provides for receiving a map of an environment. In some embodiments, the map is obtained using a 2D scanning device. In other embodiments, the map can be downloaded or received from a system or other source.

In some embodiments of the invention, the 2D map can be filtered to increase the processing efficiency allowing larger maps or more complex maps to be analyzed. One filtering technique can reduce the scale of the 2D map. For example, a 2D map having a resolution of 1000×500 can be scaled to 500×250. That is, the size of the 2D map is reduced. This allows the method to be performed considerably fast even when larger maps are processed.

In another example, areas of the 2D map that correspond to areas such as windows, open doors, or other objects can be removed to provide a more refined or updated version of the map.

In some embodiments, the obtained 2D map is initially produced as a grayscale image. In such cases, the grayscale image can be binarized into black and white pixels. The black pixels of the image can correspond to walls, obstacles or other objections while the white pixels can correspond to vacant areas, space, or light from a window or open door that is detected.

In some embodiments, noise filtering can be performed to remove areas corresponding to obstacles in the map. For example, areas of the map having single black pixels can be removed. In other examples, areas have small aggregations of black pixels can be removed where the small aggregations can be determined by a user defined or default threshold or range. In a non-limiting example, small aggregations of 4-6 pixels can be removed.

Other filtering techniques can be used to further reduce the processing complexity or in addition to those filtering techniques described above. It should be understood, a subset of the 2D map can be selected by the user to perform the method instead of the entire map.

In other embodiments, after the optional filtering and noise reduction is performed, the pixels corresponding to walls or other boundaries can be dilated and/or enlarged. That is, additional rows of black pixels can be provided to the walls. For example, 5 or 6 pixels can be added to each identified wall. The number of additional pixels that are added can be user-defined or can be default value or range.

After removing the identified noise from the map, a distance transform is then applied to the map. At block 2806, the method 2800 provides for applying a distance transform to the map to generate a path throughout the map, where the pixels/points on the path are a maximum distance from the nearest identified object such as a wall or other object.

In one or more embodiments, a distance that is further from the wall appears whiter. For each pixel in the binary image, the distance to the nearest black pixel is determined. These distances are used to determine the path as shown in FIG. 25. Block 2808 provides for identifying a set of candidate scan locations based on the path.

At block 2810, the method 2800 provides for selecting scan locations from the set of candidate scan locations for performing 3D scans. The details of selecting scan locations is described in detail with reference to FIG. 29. Finally, the scan locations are provided to a user and at block 2812 the method 2800 provides for performing 3D scans at the identified locations. In the event the scan locations do not provide the desired coverage of the environment, additional scan locations can be added to the set of scan locations. The desired coverage can be determined by configuring an unscanned area threshold and comparing the coverage provided by the set of scan locations with the unscanned area threshold. If the unscanned threshold is exceeded, additional scan locations can be added manually or automatically by the system. After adding one or more scan locations, the coverage of the map and the unscanned threshold can be checked to determine if there are a sufficient number of scan locations. This process is completed until the desired coverage or unscanned threshold is met. In one or more embodiments, a sequence can be associated with each selected scan location. The sequence indicating an order for obtaining the 3D scans that can reduce a user having to travel to the location, the amount of time scanning, and also setup times. The method 2800 ends at block 2814. It should be understood that a different order or different steps can be performed and is not limited by the example described in FIG. 28.

Figure 29:
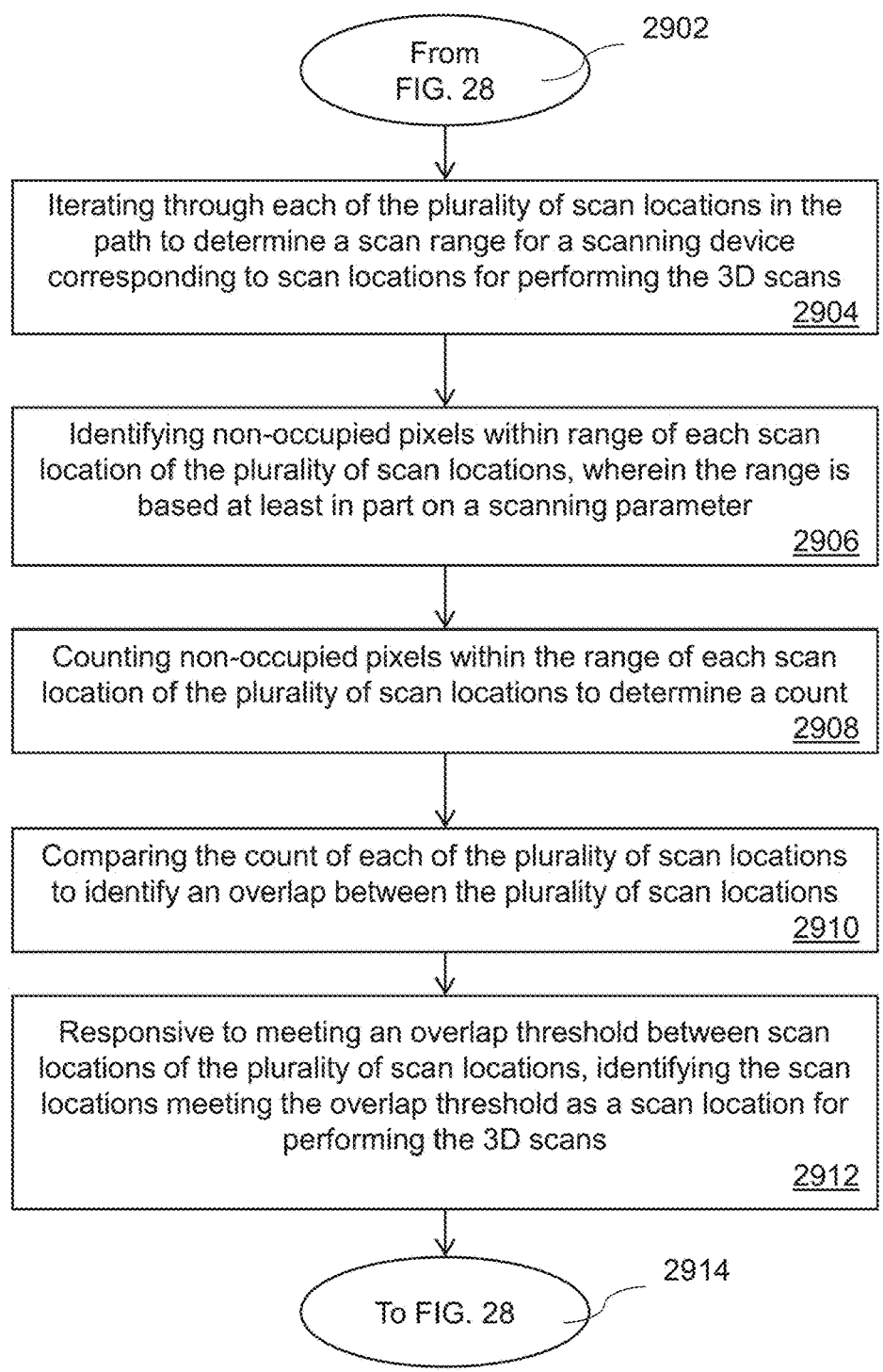
FIG. 29 is a flow diagram of a method of automatically generating scan locations in accordance with an embodiment.

Now referring to FIG. 29, the method 2900 for selecting scan locations in accordance with one or more embodiments is shown. The method 2900 continues from FIG. 28 as shown in block 2902 and proceeds to block 2904 which provides for iterating through each of the plurality of scan locations in the path to determine a scan range for a scanning device corresponding to scan locations for performing the 3D scans. Block 2906 provides for identifying non-occupied pixels within range of each scan location of the plurality of scan locations, wherein the range is based at least in part on a scanning parameter. The method 2900 continues to block 2908 and provides for counting non-occupied pixels within the range of each scan location of the plurality of scan locations to determine a count. Block 2910 provides for comparing the count of each of the plurality of scan locations to identify an overlap between the plurality of scan locations. Block 2912 provides for identifying the scan locations meeting the overlap threshold as a scan location for performing the 3D scans, responsive to meeting an overlap threshold between scan locations of the plurality of scan locations. The scanning location is selected based on the number of white pixels that are observed within each range and the amount of overlap with an adjacent scan. In some embodiments, each time a pixel is seen a counter is incremented. A score is produced to indicate a level of overlap with an adjacent scan. In an example, a higher score can indicate a better field-of-view and a larger overlap with other adjacent scan locations or scanners which can be used for improved scan registration. In one or more embodiments, ray tracing is performed and each visible pixel in the scanner visibility range is marked. Each time the pixel is seen via the ray tracing, a counter is incremented. In some embodiments, ray tracing is not performed and other known techniques can be performed to analyze each of the pixels of each scan location. The method 2900 returns to FIG. 28 at block 2914. The identified scan locations are provided to a user and are used to perform the 3D scan based on the identified scan locations.

The technical effects and benefits include increasing or maximizing coverage of the scanner at each location, and increasing the efficiency of the scanning operation by reducing the number of scans, and reducing scanning times to further reduce labor costs. The embodiments compute a path through the obtained map and allows the configuration of a number of parameters (scanner FOV, overlap threshold, unscanned tolerance threshold, etc.) to automatically generate the scan locations for the obtained map.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for automatically generating a plan of scan locations for performing a scanning operation, the system comprising:
a storage medium, the storage medium being coupled to a processor;
the processor configured to:
receive a map of an environment;
apply a distance transform to the map, wherein the distance transform determines a path through the map, wherein the path comprises a plurality of points;
identify a set of candidate scan locations based on the path;
select scan locations from the set of candidate scan locations for performing 3D scans; and
perform the 3D scans of the environment based on the selected scan locations; and
wherein identifying scan locations from the set of candidate scan locations comprises the processor further configured to iterate through each of the scan locations in the path corresponding to scan locations for performing the 3D scans;
identify non-occupied pixels within a range of each scan location of the plurality of scan locations, wherein the range is based at least in part on a scanning parameter;
count non-occupied pixels within the range of each of the plurality of scan locations to determine a count;
compare the count of each of the plurality of scan locations to identify an overlap between the plurality of scan locations; and
responsive to meeting an overlap threshold between scan locations of the plurality of scan locations, identify the scan locations as a location for performing the 3D scans.

2. The system of claim 1, wherein the scanning parameter is a scanning visibility range of a scanning device.

3. The system of claim 1, wherein the distance transform computes a Voronoi Diagram over the map.

4. The system of claim 1, wherein the processor is configured to filter the map prior to applying the distance transform to the map, wherein filtering includes reducing the scale of the map, binarizing a grayscale image of the map, or removing noise from the map based on a threshold number of pixels.

5. The system of claim 1, wherein the processor is configured to inflate obstacles identified in the map by adding rows of occupied pixels prior to counting the non-occupied pixels within the range.

6. The system of claim 1, wherein the processor is configured to evaluate coverage of the identified scanning locations of the map;
compare the coverage to an unscanned area threshold; and
add one or more scan locations based at least in part on the comparison until the unscanned threshold is reached.

7. A method for automatically generating a plan of scan locations for performing a scanning operation, the method comprising:
receiving a map of an environment;
applying a distance transform to the map, wherein the distance transform determines a path through the map, wherein the path comprises a plurality of scan locations;
identifying a set of candidate scan locations based on the path;
selecting scan locations from the set of candidate scan locations for performing 3D scans; and
performing the 3D scans of the environment based on the selected scan locations
wherein identifying scan locations from the set of candidate scan location comprises iterating through each of the plurality of scan locations in the path corresponding to scan locations for performing a scan;
identifying non-occupied pixels within range of each scan location of the plurality of scan locations, wherein the range is based at least in part on a scanning parameter;
counting non-occupied pixels within the range of each of the plurality of scan locations to determine a count;
comparing the count of each of the plurality of scan locations to identify an overlap between the plurality of scan locations; and
responsive to meeting an overlap threshold between scan locations of the plurality of scan locations, identifying the scan locations as a location for performing the 3D scans.

8. The method of claim 7, wherein the scanning parameter is a scanning visibility range of a scanning device.

9. The method of claim 7, wherein the distance transform computes a Voronoi Diagram.

10. The method of claim 7, further comprising filtering the map prior to applying the distance transform to the map, wherein filtering includes reducing the scale of the map, binarizing a grayscale image of the map, or removing noise from the map based on a threshold number of pixels.

11. The method of claim 7, further comprising inflating obstacles identified in the map by adding rows of occupied pixels prior to counting the non-occupied pixels within the range.

12. The method of claim 7, further comprising:
evaluating coverage of the identified scanning locations of the map;
comparing the coverage to an unscanned area threshold; and
adding one or more scan locations based at least in part on the comparison until the unscanned threshold is reached.

13. A computer program product for automatically generating a plan of scan locations for performing a scanning operation, the computer program product comprising a non-transitory computer-readable storage medium having program instructions embodied therewith, the program instructions executable by a processor to cause the processor to:
receive a map of an environment;
apply a distance transform to the map, wherein the distance transform determines a path through the map, wherein the path comprises a plurality of scan locations;

identify a set of candidate scan locations based on the path;
select scan locations from the set of candidate scan locations for performing 3D scans; and
perform the 3D scans of the environment based on the selected scan locations wherein the instructions are further executable by the processor to cause the processor to identify scan locations from the set of candidate scan location comprises iterating through each of the plurality of scan locations in the path corresponding to scan locations for performing a scan;
identify non-occupied pixels within range of each scan location of the plurality of scan locations, wherein the range is based at least in part on a scanning parameter, wherein the scanning parameter is a scanning visibility range of a scanning device;
count non-occupied pixels within the range of each of the plurality of scan locations to determine a count;
compare the count of each of the plurality of scan locations to identify an overlap between the plurality of scan locations; and
responsive to meeting an overlap threshold between scan locations of the plurality of scan locations, identify the scan locations as a location for performing the 3D scans.

14. The computer program product of claim 13, wherein the distance transform computes a Voronoi Diagram.

15. The computer program product of claim 13, wherein the instructions are further executable by the processor to cause the processor to filter the map prior to applying the distance transform to the map, wherein filtering includes reducing the scale of the map, binarizing a grayscale image of the map, or removing noise from the map based on a threshold number of pixels.

16. The computer program product of claim 13, further comprising inflating obstacles identified in the map by adding rows of occupied pixels prior to counting the non-occupied pixels within the range.

17. The computer program product of claim 13, wherein the instructions are further executable by the processor to cause the processor to:
evaluate coverage of the identified scanning locations of the map;
compare the coverage to an unscanned area threshold; and
add one or more scan locations based at least in part on the comparison until the unscanned threshold is reached.

* * * * *